US006611249B1

(12) United States Patent
Evanicky et al.

(10) Patent No.: US 6,611,249 B1
(45) Date of Patent: Aug. 26, 2003

(54) SYSTEM AND METHOD FOR PROVIDING A WIDE ASPECT RATIO FLAT PANEL DISPLAY MONITOR INDEPENDENT WHITE-BALANCE ADJUSTMENT AND GAMMA CORRECTION CAPABILITIES

(75) Inventors: Daniel E. Evanicky, San Jose, CA (US); Oscar Ivan Medina, San Jose, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/120,960

(22) Filed: Jul. 22, 1998

(51) Int. Cl.[7] ................................................ G09G 3/36
(52) U.S. Cl. ......................................... 345/102; 345/89
(58) Field of Search ................................ 345/150, 153, 345/154, 207, 88, 102, 600, 589, 89

(56) References Cited

U.S. PATENT DOCUMENTS 4,379,292 A * 4/1983 Minato et al. ............... 340/701
4,386,345 A * 5/1983 Narveson et al. ........... 340/703
4,622,584 A   11/1986 Nagasaki et al. ............. 358/98

(List continued on next page.)

FOREIGN PATENT DOCUMENTS

| EP | 0 367 568 | 5/1990 |
| EP | 0 451 943 A2 | 10/1991 |
| EP | 0 488 393 A2 | 6/1992 |

(List continued on next page.)

OTHER PUBLICATIONS

Patent Abstracts of Japan, Publication No. 04130628, Jan. 5, 1992 (Sanyo Electric Co Ltd).
Patent Abstracts of Japan, Publication No. 06084837, Mar. 25, 1994 (Mitsubishi Electric Corp).
Patent Abstracts of Japan, Publication No. 06280059, Apr. 10, 1994 (Kawasaki Heavy Ind Ltd).
Patent Abstracts of Japan, Publication No. 09092643, Apr. 4, 1997 (Toshiba Corp).

(List continued on next page.)

*Primary Examiner*—Richard Hjerpe
*Assistant Examiner*—Kevin M. Nguyen
(74) *Attorney, Agent, or Firm*—Baker Botts L.L.P.

(57) ABSTRACT

A system and method are described herein for controlling the white balance and providing gamma correction without compromising gray-scale dynamic range in a flat panel liquid crystal display (LCD). According to one embodiment of the present invention, the flat panel LCD includes electronic circuitry for coupling to a host computer to receive a white-balance adjustment control signal, and electronic circuitry for receiving image data to be rendered on the flat panel LCD. Further, the flat panel LCD of one embodiment is configured for coupling to a color-sensing device to receive optical characteristics data of the flat panel LCD detected by the color-sensing device. The white balance adjustment mechanisms include the provision of two or more light sources of differing color temperature, whose brightness can be independently varied (and distributed through a light distribution mechanism) to adjust color temperature without altering the grayscale resolution of the RGB colors. The present invention further includes white balance adjustment software and gamma correction software for generating white-balance adjustment control signals and appropriate gamma correction curves.

29 Claims, 11 Drawing Sheets

U.S. PATENT DOCUMENTS

| | | | |
|---|---|---|---|
| 4,842,378 A | | 6/1989 | Flasck et al. ................ 350/345 |
| 4,859,908 A | | 8/1989 | Yoshida et al. |
| 4,912,558 A | * | 3/1990 | Easterly et al. ......... 358/213.16 |
| 5,132,825 A | * | 7/1992 | Miyadera ................. 348/227.1 |
| 5,206,673 A | | 4/1993 | Kawahara et al. ............ 353/98 |
| 5,207,493 A | | 5/1993 | Murase et al. ................. 362/31 |
| 5,250,937 A | * | 10/1993 | Kikuo et al. ................... 345/89 |
| 5,273,609 A | | 12/1993 | Moslehi |
| 5,292,370 A | | 3/1994 | Tsai et al. |
| 5,298,993 A | | 3/1994 | Edgar et al. ................ 348/180 |
| 5,302,946 A | * | 4/1994 | Shapiro et al. ............... 345/88 |
| 5,315,378 A | * | 5/1994 | Satou et al. ................ 348/655 |
| 5,333,073 A | | 7/1994 | Suzuki ........................ 359/50 |
| 5,337,068 A | * | 8/1994 | Stewart et al. ............... 345/88 |
| 5,353,075 A | | 10/1994 | Conner et al. ............. 353/122 |
| 5,359,691 A | * | 10/1994 | Tai et al. .................... 362/561 |
| 5,371,537 A | * | 12/1994 | Bohan et al. ............... 348/181 |
| 5,381,309 A | | 1/1995 | Borchardt .................... 362/27 |
| 5,394,308 A | | 2/1995 | Watanbe et al. ............. 362/31 |
| 5,404,185 A | | 4/1995 | Vogeley et al. ............. 353/122 |
| 5,428,720 A | * | 6/1995 | Adams, Jr. ................... 395/131 |
| 5,477,423 A | | 12/1995 | Fredriksz et al. ............ 362/31 |
| 5,479,328 A | | 12/1995 | Lee et al. ................... 362/216 |
| 5,485,354 A | | 1/1996 | Ciupke et al. ................ 362/31 |
| 5,502,458 A | * | 3/1996 | Braudaway et al. ........ 345/153 |
| 5,548,670 A | | 8/1996 | Koike ......................... 385/27 |
| 5,550,657 A | | 8/1996 | Tanaka et al. ................ 359/49 |
| 5,568,164 A | | 10/1996 | Ogawa ....................... 345/145 |
| 5,593,221 A | | 1/1997 | Evanicky et al. ............ 353/122 |
| 5,638,117 A | | 6/1997 | Engeldrum et al. ......... 348/179 |
| 5,654,779 A | | 8/1997 | Nakayama et al. ........... 349/58 |
| 5,661,531 A | * | 8/1997 | Greene et al. ................ 349/73 |
| 5,661,839 A | | 8/1997 | Whitehead .................. 385/131 |
| 5,680,180 A | * | 10/1997 | Huang ........................ 348/656 |
| 5,688,035 A | | 11/1997 | Kashima et al. ............. 362/31 |
| 5,696,529 A | | 12/1997 | Evanicky et al. ........... 345/126 |
| 5,731,794 A | * | 3/1998 | Miyazawa ................... 345/88 |
| 5,739,809 A | * | 4/1998 | McLaughlin et al. ....... 345/150 |
| 5,886,681 A | * | 3/1999 | Walsh et al. ................ 345/102 |
| 5,898,414 A | * | 4/1999 | Awamoto et al. ............. 345/55 |
| 5,920,358 A | * | 7/1999 | Takemura ................... 348/655 |
| 5,926,239 A | * | 7/1999 | Kumar et al. ................. 349/69 |
| 5,986,641 A | * | 11/1999 | Shimamoto ................. 345/204 |
| 6,023,131 A | * | 2/2000 | Okita ......................... 315/291 |
| 6,036,327 A | * | 3/2000 | Blonder et al. ............... 362/31 |
| 6,043,797 A | * | 3/2000 | Clifton et al. .................. 345/1 |
| 6,072,458 A | * | 6/2000 | Asakawa et al. ........... 345/101 |
| 6,184,957 B1 | * | 2/2001 | Mori et al. .................. 349/117 |
| 6,243,059 B1 | * | 6/2001 | Greene et al. ................ 345/1.3 |
| 6,256,425 B1 | * | 7/2001 | Kunzman ................... 348/742 |

FOREIGN PATENT DOCUMENTS

| | | | |
|---|---|---|---|
| EP | 0 522 296 A2 | 1/1993 | |
| EP | 0539943 A1 | 5/1993 | ............ G09G/1/28 |
| EP | 0562971 A1 | 9/1993 | .......... H04N/17/04 |
| EP | 0597797 A1 | 5/1994 | ............ G09G/5/06 |
| EP | 0840524 A1 | 5/1998 | ............ H04N/9/31 |
| EP | 0915363 A2 | 5/1999 | ......... G02F/1/1335 |
| FR | 2 614 041 | 10/1988 | |
| JP | 1-316790 | 12/1989 | ............ G09F/9/00 |
| JP | 4-149417 | 5/1992 | ......... G06B/21/132 |
| WO | WO 86/06923 | 11/1986 | |
| WO | WO 92/14258 | 8/1992 | |
| WO | 96/01466 | 1/1996 | ............ G09G/5/02 |
| WO | WO 96/15545 | 5/1996 | |
| WO | WO 99/01888 | 1/1999 | |

OTHER PUBLICATIONS

Patent Abstracts of Japan, Publication No. 58202533, Nov. 25, 1983 (Hitachi Ltd).

Patent Abstracts of Japan, Publication No. 59121747, Jul. 13, 1984 (Fujitsu Ltd).

"White Balance Control Methods On Liquid Crystal Display", IBM Technical Disclosure Bulletin, vol. 37, No. 11, Nov. 1, 1994, pp. 425/426.

\* cited by examiner

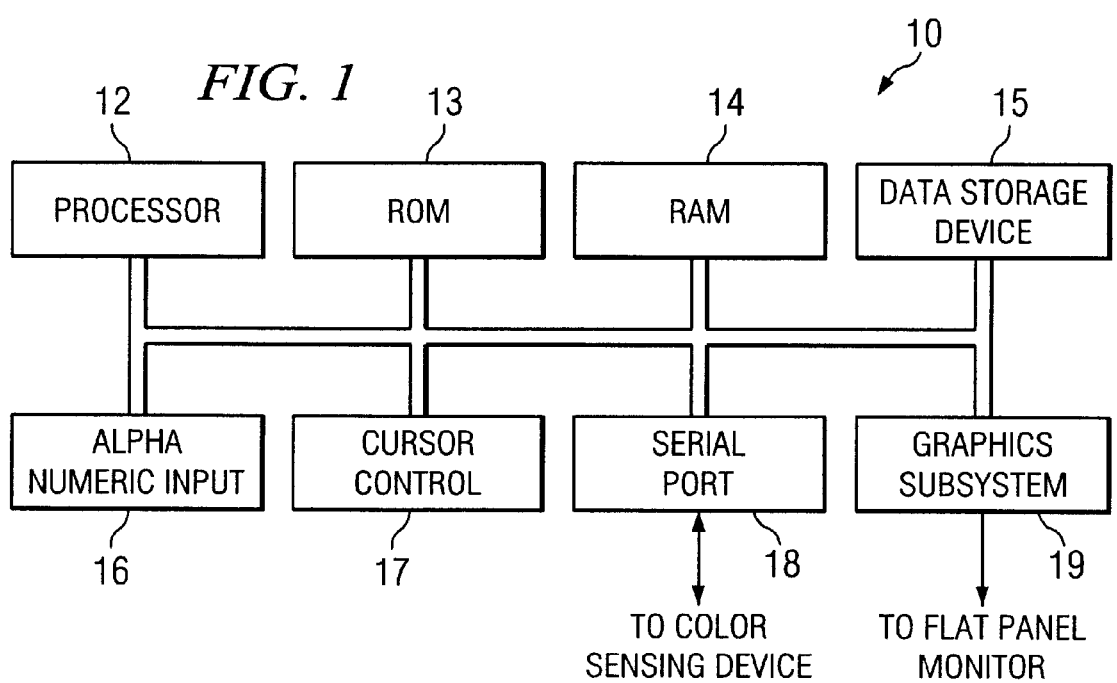
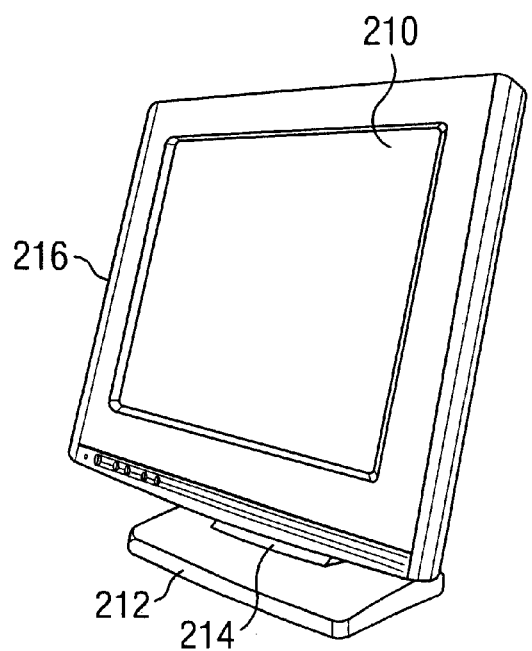

SYSTEM AND METHOD FOR PROVIDING A WIDE ASPECT RATIO FLAT PANEL DISPLAY MONITOR INDEPENDENT WHITE-BALANCE ADJUSTMENT AND GAMMA CORRECTION CAPABILITIES

RELATED CASE

The instant application is a continuation-in-part of U.S. patent application Ser. No. 09/087,745, filed on May 29, 1998, and entitled "A Multiple Light Source Color Balancing System Within A Liquid Crystal Flat Panel Display," by Evanicky and assigned to the assignee of the present invention.

FIELD OF THE INVENTION

The present invention pertains to the field of display devices. More specifically, the present invention is related to the field of gamma correction and white-balance adjustment in flat panel displays.

BACKGROUND OF THE INVENTION

Flat panel liquid crystal displays (LCDs) are popular display devices for conveying information generated by a computer system. The decreased weight and size of a flat panel display greatly increases its versatility over a cathode ray tube (CRT) display. Flat panel LCD monitors are used today in many applications including the computer component and computer periphery industries where flat panel LCD monitors are an excellent display choice for lap-top computers and other portable electronic devices. Because flat panel LCD technology is improving, more and more flat panel LCD monitors are rapidly replacing CRT displays in other mainstream applications, such as desktop computers, high-end graphics computers, and as televisions and other multi-media monitors.

In flat panel LCD monitors, much like conventional CRT displays, a white pixel is composed of a red, a green and a blue color point or "spot." When each color point of the pixel is excited simultaneously and with the appropriate energy, white can be perceived by the viewer at the pixel screen position. To produce different colors at the pixel, the intensity to which the red, green and blue points are driven is altered in well known fashions. The separate red, green and blue data that corresponds to the color intensities of a particular pixel is called the pixel's color data. Color data is often called gray scale data. The degree to which different colors can be achieved within a pixel is referred to as gray scale resolution. Gray scale resolution is directly related to the amount of different intensities, or shades, to which each red, green and blue point can be driven.

The method of altering the relative color intensities of the color points across a display screen is called white balance adjustment (also referred to as color balance adjustment, color temperature adjustment, white adjustment, or color balancing). In a display, the "color temperature" of white correlates to the relative percentage contributions of its red, green and blue intensity components. In addition, the "color temperature" of white correlates to the luminous energy given off by an ideal black body radiating sphere at a particular temperature expressed in degree Kelvin (K). Relatively high degree K color temperatures represent "white" having a larger blue contribution (e.g., a "cooler" look). Relatively small degrees K color temperatures represent "white" having a larger red contribution (e.g., a "warmer" look). Generally, the color temperature of a display screen is adjusted from blue to red while avoiding any yellowish or green-ish variations within the CIE chromaticity diagram.

In conventional CRT devices, white balance is adjusted by independently altering the voltage gains of the primary electron guns (e.g., red, green and blue guns) depending on the desired color temperature. However, this prior art color balancing technique reduces the dynamic gray scale range of some or all of the RGB colors, as well as the overall color gamut of the display. In some conventional flat panel LCDs, a shift in color temperature may be achieved by adjusting the relative intensities of the RGB gray levels in a manner analogous to the adjusting of the gain of the electron guns of the CRT devices. However, this prior art method also causes the LCDs to lose dynamic gray scale range and color gamut.

Another prior art method of adjusting the white balance within a flat panel LCD screen pertains to altering the physical color filters used to generate the red, green and blue color points. By altering the color of the filters, the color temperature of the LCD screen can be adjusted. However, this adjustment is not dynamic because the color filters need to be physically (e.g., manually) replaced each time adjustment is required. It would be advantageous to provide a color balancing mechanism for a flat panel LCD screen that can respond, dynamically, to required changes in the color temperature of the display.

The white balance adjustment for a display is important because many users want the ability to alter the display's color temperature for a variety of different reasons. For instance, the color temperature might be varied based on a viewer's personal taste. In other situations, color temperature adjustment may be needed to compensate for manufacturing variations in the display. In some situations, color temperature adjustment can correct for the effects of aging in some displays. Particularly, color critical applications such as pre-press soft proofing, desktop publishing, graphics design, medical imaging, and, digital photography and video editing, etc., require white balance values and gamma values of different displays to be precisely matched in order to accurately view and exchange images with confidence. Thus, without an efficient and effective method of providing dynamic white balance adjustment capabilities, flat panel LCDs have heretofore been unused in color critical applications which require precise color calibration and matching. Therefore, what is, needed is an efficient and effective method of providing dynamic white balance adjustment capabilities in flat panel LCDs.

Accordingly, the present invention provides a display for mechanism and method for dynamically adjusting the color balance of a flat panel liquid crystal display without compromising the gray-scale resolution of the pixels. Further, the present invention provides a mechanism and method for adjusting the color balance of a flat panel display screen without complicated circuitry. Embodiments of the present solution also performs gamma correction and frame rate time domain modulation to reduce scalloping and visual artifacts. These and other advantages of the present invention not specifically mentioned above will become clear within discussions of the present invention presented herein.

SUMMARY OF THE PRESENT DISCLOSURE

A system and method are described herein for controlling the white balance and providing gamma correction without compromising gray-scale resolution in a flat panel liquid crystal display (LCD). According to one embodiment of the present invention, the flat panel LCD includes electronic circuitry for coupling to a host computer to receive a white-balance adjustment control signal, and electronic circuitry for receiving image data to be rendered on the flat panel LCD. Further, the flat panel LCD of one embodiment is configured for coupling to a light-sensing device to detect optical characteristics of the flat panel LCD.

According to one embodiment of the present invention, the flat panel LCD comprises a large display area liquid crystal display screen having an aspect ratio that is greater than 1.3:1. In one embodiment, the aspect ratio is substantially 1.6:1, having 1,600 pixels across the horizontal and 1,024 pixels along the vertical. In this embodiment, the flat panel LCD is an SXGA-wide aspect ratio flat panel display monitor having high-resolution for displaying high-information content. This embodiment is particularly well suited for displaying text, graphics and other types of still and/or motion audio/visual works. The wide aspect ratio allows the display of multiple pages, side-by-side, there by facilitating certain tasks such as desktop publishing, prepress soft-proofing, video and digital photography editing, medical imaging, and graphics animation and design. The flat panel display of the present invention further, includes compensation film layers for providing enhanced off axis viewing capability in the horizontal and vertical axes.

Significantly, the flat panel LCD of one embodiment of the present invention provides white-balance adjustment capabilities. The white balance adjustment mechanisms include the provision of two pairs of light sources of differing color temperature, whose brightness can be independently varied (and distributed through a light distribution mechanism) to adjust color temperature without altering the dynamic range of the grayscale resolution of the RGB colors. The flat panel display of the present invention also provides a white-balance adjustment control input for receiving a white-balance adjustment control signal, and a control circuit responsive to the white-balance adjustment control signal for adjusting color temperature of the display by altering the brightness of the appropriate light sources. In one embodiment of the present invention, a white balance adjustment control signal is generated by the host computer, and is transmitted to the flat panel LCD unit via an inter-integrated circuit (I2C) bus.

According to one embodiment of the present invention, the flat panel LCD monitor is configured for coupling to a digital computer system to receive image data to be rendered on the flat panel LCD monitor, and to receive control signals such as white-balance adjustment control signals and power management control signals. In the present embodiment, a dual-channel low-voltage differential signal (LVDS) interface is used for transmitting image data from the host computer to the flat panel LCD unit. This interface provides sufficient bandwidth for displaying high information content, image data. In one embodiment of the invention, the host computer includes a color look-up table for providing gamma correction to the image data on the fly. One embodiment of the present invention further includes white balance adjustment software and gamma correction software for generating white-balance adjustment control signals and appropriate gamma correction curves. In one embodiment, the host computer further comprises frame-rate time domain modulation circuitry for processing the image data in order to reduce scalloping effects and other visual artifacts.

According to one embodiment of the present invention, light-sensing device comprises a low-cost luminance sensor specially designed for coupling to a flat panel LCD monitor during monitor calibration. The specially designed luminance sensor is not configured for attaching to the flat panel display by suction. Rather, the luminance sensor is configured for attaching to the flat panel display during monitor calibration by non-suction attachment means. By using non-suction type attachment means, optical characteristics of the flat panel LCD monitor are not distorted during monitor calibration.

Significantly, during monitor calibration, luminance values of the flat panel LCD monitor are measured by the luminance sensor. The luminance values are then used to construct the optical characteristics of the flat panel LCD monitor. The constructed optical characteristics are then matched to a set of target, or reference, optical characteristics. The host computer then adjusts the white balance of the flat panel LCD monitor and/or the gamma values of the RGB colors according to any discrepancies between the constructed optical characteristics and the reference optical characteristics until a precise match is achieved. In this way, precise color calibration is achieved in flat panel LCD monitors with an inexpensive luminance sensor.

Embodiments include the above and wherein the large area wide aspect ratio liquid crystal flat panel display screen is non-emissive and further comprises: a first light source of a first color temperature; and a second light source of a second color temperature different from the first color temperature, the first and second light sources positioned to illuminate the wide aspect ratio liquid crystal flat panel display screen with light having a net color temperature that is dependent on an intensity of the first light source and an intensity of the second light source wherein the first and the second light sources alter the net color temperature of the light, within a predetermined color temperature range, by controlling the intensity of the first light source and the intensity of the second light source. Additionally, the flat panel display screen may comprise a light pipe optically coupled to receive light from the first light source and said light source for illuminating the liquid crystal flat panel display screen with the light from the first and second light sources.

BRIEF DESCRIPTION OF THE DRAWINGS

The accompanying drawings, which are incorporated in and form a part of this specification, illustrate embodiments of the present invention and, together with the description, serve to explain the principles of the invention.

FIG. 1 illustrates an exemplary computer system used as part of a computer graphics system in accordance with one embodiment of the present invention.

FIG. 2 illustrates a display assembly of the present invention including wide aspect ratio display, stand and base components.

DETAILED DESCRIPTION OF THE PREFERRED EMBODIMENTS

Figure 3:
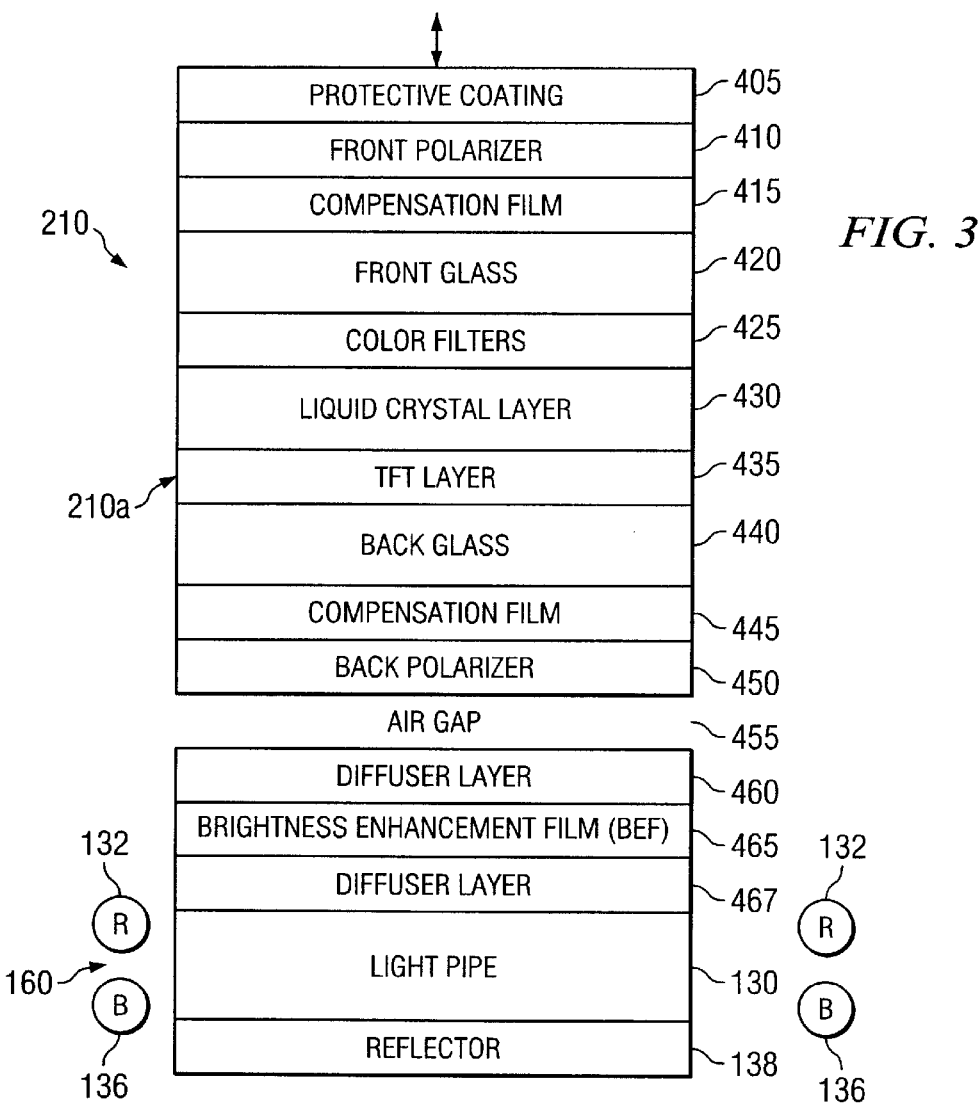
FIG. 3 is a cross section through the layers of the wide aspect ratio liquid crystal display according to one embodiment of the present invention.

Reference will now be made in detail to the present embodiments of the invention, examples of which are illustrated in the accompanying drawings. While the invention will be described in conjunction with the present embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description, for purposes of explanation, numerous specific details are set forth in order to provide a thorough understanding of the present invention. It will be obvious, however, to one skilled in the art, upon reading this disclosure, that the present invention may be practiced without these specific details. In other instances, well-known structures and devices are not described in detail in order to avoid obscuring aspects of the present invention.

Unless specifically stated otherwise as apparent from the following discussions, it is appreciated that throughout the present invention, discussions utilizing terms such as "receiving", "determining", "composing", "storing", or the like, refer to the actions and processes of a computer system, or similar electronic computing device. The computer system or similar electronic device manipulates and transforms data represented as physical (electronic) quantities within the computer system's registers and memories into other data similarly represented as physical quantities within the computer system memories into other data similarly represented as physical quantities within the computer system memories or registers or other such information storage, transmission, or display devices.

Computer System Environment of the Present Invention

With reference to FIG. 1, portions of the present invention are comprised of computer-readable and computer executable instructions which reside, for example, in computer-usable media of a computer system. FIG. 1 illustrates an exemplary computer system 10 used as a part of a system for providing white balancing and gamma correction for a flat panel monitor in accordance with one embodiment of the present invention. It is appreciated that computer system 10 of FIG. 1 is exemplary only and that the present invention can operate within a number of different computer systems including general purpose computer systems, embedded computer systems, and stand alone computer systems specially adapted for generating and displaying graphics images. It is also appreciated that the various aspects of the present invention can be made to function if the flat panel monitor is addressed by a remote computer system, or a "server," which also interacts with other similar flat panel monitors within its network.

Computer system 10 of FIG. 1 includes an address/data bus 11 for communicating information, and a central processor unit 12 coupled to bus 11 for processing information and instructions. Computer system 10 also includes data storage features such as computer-usable volatile memory 14, e.g. random access memory (RAM), coupled to bus 11 for storing information and instructions for central processor unit 12, computer-usable non-volatile memory 13, e.g. read only memory (ROM), coupled to bus 11 for storing static information and instructions for the central processor unit 12, and a data storage device 15 (e.g., a magnetic or optical disk and disk drive) coupled to bus 11 for storing information and instructions. Computer system 10 further includes a serial port 18 for coupling to peripheral devices such as a color sensing device. A graphics subsystem 19, which may include a graphics co-processor for off loading computational burden from central processor unit 12 and embedded DRAM for increased memory bandwidth, coupled to bus 11, is also included in computer system 10 of FIG. 1. In one embodiment, graphics subsystem 19 is configured for coupling to a flat panel. LCD monitor for displaying information and image data. Details of the graphics subsystem 19 and the interface to the flat panel LCD monitor will be discussed in detail below.

Computer system 10 of the present invention also includes an optional alphanumeric input device 16 including alphanumeric and function keys coupled to bus 11 for communicating information and command selections to central processor unit 12. Computer system 10 also optionally includes a cursor control device 17 coupled to bus 11 for communicating user input information and command selections to central processor unit 12. Optional cursor control device 17 allows the computer user to signal dynamically the two-dimensional movement of a visible symbol (cursor)

on a display screen. Many implementations of cursor control device 17 are known in the art including a trackball, mouse, touch pad, joystick, or special keys on alphanumeric input device 16 capable of signaling movement of a given direction or manner of displacement. Alternatively, it will be appreciated that a cursor can be directed and/or activated via input from alphanumeric input device 16 using special keys and key sequence commands. The present invention is also well suited to directing a cursor by other means such as, for example, voice commands. Computer system 10 may further include a communication device (e.g. a modem) for communicating with a computer network.

Wide Aspect Flat Panel LCD Monitor of the Present Invention

FIG. 2 illustrates a monitor 216 in accordance with the present invention. The monitor 216 includes a display screen 210 for viewing high information content display. The flat panel display screen 210 ("display 210") of the present invention is digitally addressed in an (x, y) matrix of pixels over the entire area of the display. Display screen 210 includes a thin film transistor (TFT) liquid crystal display layer. The monitor 216 is coupled to a height adjustable stand 214 that is supported by base 212. Stand 214 (or "tower") allows both elevation and tilt adjustments. The monitor 216 of the present invention is a large area wide aspect ratio flat panel monitor having high resolution for the display of high information content, such as graphics images and/or textual information including alphanumeric characters.

The monitor 216, in one implementation, is high resolution supporting the SXGA-Wide display format. The SXGA-Wide display format has 1,600 pixels across the horizontal dimension and 1,024 pixels down the vertical dimension. The aspect ratio of the SXGA-Wide compliant implementation of the monitor of the present invention is approximately 1:6:1. Within the context of the present invention, an aspect ratio greater than 1.3:1 is considered to be a wide aspect ratio. The present invention having a display screen of 369.6 mm by 236.54 mm is therefore a large viewing area wide aspect ratio flat panel display unit. Because the pixel pitch (e.g., the distance between pixel centers) of the monitor 216 is 0.231 mm, it is very well suited for the display of textual information (e.g., alphanumeric characters) as well as graphic images, both being high information content. Therefore, the monitor 216 of the present invention is well suited for desktop publishing applications, graphics design applications, digital photography and video applications, medical imaging, pre-press soft-proofing, etc. A more detailed description of the wide aspect ratio flat panel LCD monitor 216 can be found in U.S. patent application Ser. No. 09/120,983, filed Jul. 22, 1998, and entitled "A Large Area Wide Aspect Ratio Flat Panel Monitor Having High Resolution for High Information Content Display," which is hereby incorporated by reference.

FIG. 3 is a cross section of the layers of the flat panel display screen 210 in accordance with one embodiment of the present invention. The flat panel display 210 can be used with a fixed-in-place backlighting unit or can be used with a removable backlighting assembly. Also, although FIG. 3 illustrates an edge lighting embodiment, display 210 can also be directly backlit as described further below. The layers of display screen 210 are described from the bottom up ending with the viewed surface 210*a*.

The flat panel display 210, in accordance with one embodiment of the present invention, provides white balance adjustment by independently varying the brightness of two pairs of light sources (e.g., CCF tubes) 132 and 136 that belong to a lighting configuration 160. For a predetermined range of color temperatures, having a minimum temperature (e.g., 5,000 K) and a maximum temperature (e.g., 7,000 K), a first pair of light sources 132 are provided that have a wavelength spectrum with an overall color temperature less than the minimum temperature of the predetermined range; herein, light sources 132 with this characteristic are called the "red" light sources for convenience. Also, a second pair of light sources 136 are provided that has a wavelength spectrum with an overall color temperature that is greater than the maximum temperature of the predetermined range; herein, light sources 136 with this characteristic are called the "blue" light sources for convenience.

Significantly, the present invention provides for a mechanism and method for adjusting the brightness of the two pairs of light sources 132 and 136 of lighting configuration 160. Particularly, the monitor 216 includes an white-balance adjustment control signal input configured for coupling to a digital computer system to receive a white-balance adjustment control signal, and control circuitry responsive to the white-balance adjustment control signal for controlling the brightness of the two pairs of light sources 132 and 136. In addition, in one embodiment of the present invention, the monitor 216 further comprises circuitry configured for coupling to a light-sensing device (e.g. an calorimeter or a luminance sensor) to measure optical characteristics data of the monitor 216. Furthermore, in that embodiment, the monitor 216 may further comprise a color characteristics data output for providing to the digital computer system the characteristics data to be used during calibration. The calibration process, as well as the digital computer system, the mechanisms for gamma correction and white-balance adjustment, and various embodiments of the light sensing device will be discussed in detail below.

Also in the lighting configuration 160 shown in FIG. 3, the red light sources 132 are optically coupled to provide light to a light pipe 130. The red light sources 132 are positioned along an edge of the light pipe 130. Likewise, the blue light sources 136 are optically coupled to provide light to light pipe 130. The blue light sources 136 are also positioned along an edge of light pipe 130. In the embodiment 160 of FIG. 3, the light sources 132 and 136 are long thin tubes which are positioned on opposite sides of the planar light pipe 130. The light sources 132 and 136 are positioned to be substantially parallel with each other. The power supply for each pair of light source 132 and 136 receive a separate voltage signal for independently controlling its brightness with respect to the other pair of light source. It is appreciated that the positions of the red tubes 132 and the blue tubes 136 can be switched without departing from the scope of the invention. Other embodiments of the light configuration in accordance with the present invention, such as "L-shaped" light tubes, may be found in U.S. patent application Ser. No. 09/087,745, filed on May 28, 1998, and entitled "A Multiple Light Source Color Balancing System Within A Liquid Crystal Flat Panel Display," now U.S. Pat. No. 6,366,270 B1, and U.S. patent application Ser. No. 09/120,983, filed Jul. 22, 1998 and entitled "A Large Area Wide Aspect Ratio Flat Panel Monitor Having High Resolution For High Information Content Display," both of which are incorporated by reference.

Within display screen 210 of FIG. 3, a rear reflector layer 138 is positioned on one side of the light pipes. On the other side of the light pipes, diffuser layers 460 and 467 (mylar) are positioned next to one or more brightness enhancement layers (BEFs) 465. An air gap 455 is then disposed. Layer 460 can optionally be covered by a protective layer (not shown). Layer 460 is then followed by a back or rear polarizer layer 450 that is positioned next to the air gap 455. The display screen 210 includes the back polarizer layer 450 followed by bi-refringegent compensation film 445 which is followed by a back glass layer 440.

The back glass layer 440 of FIG. 3 is followed by a selectively energized transistor layer 435 and an LCD layer 430, followed by red/green/blue color filter layers 425. The TFT layer 435 is composed of selectively addressed amorphous silicon thin film transistors (TFT) which charge up their respective capacitors. The color filter layer 425 is followed by a front glass layer 420. The front glass layer 420 is followed by another compensation film layer 415 (e.g., a birefringence compensation film layer) which is followed by a second or front polarizer layer 410. A protective coating layer 405 is placed in front of the front polarizer layer 410 and provides a non-glare viewing surface.

It is appreciated that the present invention's use of compensation film layers for improving view angle, in lieu of using dual domain technology as done in the prior art, has several advantages. First of the advantages is a significantly reduced manufacturing process whereby three major steps are used by the present invention rather than 15 steps required of dual domain technology. Namely, the present invention utilizes a first step of applying polyimide, a second step of baking and a third step of rubbing. By reducing the process steps from 15 to 3, thereby eliminating many of the steps required of dual domain techniques, the use of compensation film layers by the present invention significantly reduces manufacturing costs for monitor 216 while improving view angle both vertically and horizontally. It is appreciated that the present invention utilizes the compensation film layers 445 and 415 to increase both horizontal and vertical viewing angles of the monitor 216. It is further appreciated that the present invention utilizes the compensation film layers 445 and 415 to increase the horizontal and vertical viewing angles of a large area monitor with a wide aspect ratio for viewing high information content images and having the colors of those images be consistent over that wide area.

The liquid crystal layer 430 of FIG. 3, in one embodiment Of the present invention, is characterized in that it is a twisted nematic liquid crystal layer. In a first alternative embodiment, the liquid crystal layer 430 is an in plane switching (IPS) layer without a molecular pre-tilt angle thereby increasing the off-axis viewing capability of monitor 216. In a second alternative embodiment, the liquid crystal layer 430 is an antiferroelectric layer also used without a molecular pre-tilt angle thereby increasing the off-axis viewing capability of monitor 216. In these embodiments, although viewing angles are increased, there are some limitations: response times of the IPS display is somewhat affected due to the fact that IPS liquid crystals are some what slower than twisted nematic liquid crystals; and anitferroelectric liquid crystal shave difficulties in displaying large number of gray levels without special addressing circuitry.

The white balance or color temperature of display screen 210 is maintained and adjusted using the two pairs of independently controlled light sources 132 and 136. The white balance is adjusted by altering the brightness of the pairs of light sources 132 and 136 independently. The phosphor mix (e.g., contribution of red, green and blue phosphor) of the two pairs of light sources 132 and 136 is selected so that the white balance can be adjusted by varying the brightness of the light sources. The light pipe 130 is acrylic and contains an extraction system that uniformly, and independently distributes the light from each light source across the viewing area of the display.

In one embodiment, the light sources 132 and 136 are cold cathode fluorescent (CCF) tubes and, in another embodiment, hot cathode fluorescent (HCF) tubes are used Constraints are placed on the amount of brightness variation tolerated during white adjustment such that the overall brightness of the display never decreases be low a percentage of the maximum brightness. output by the light sources 132 and 136. In one implementation, this percentage is selected at 70 percent which requires the ratios of the phosphors in the CCF tubes to be adjusted accordingly.

Figure 4:
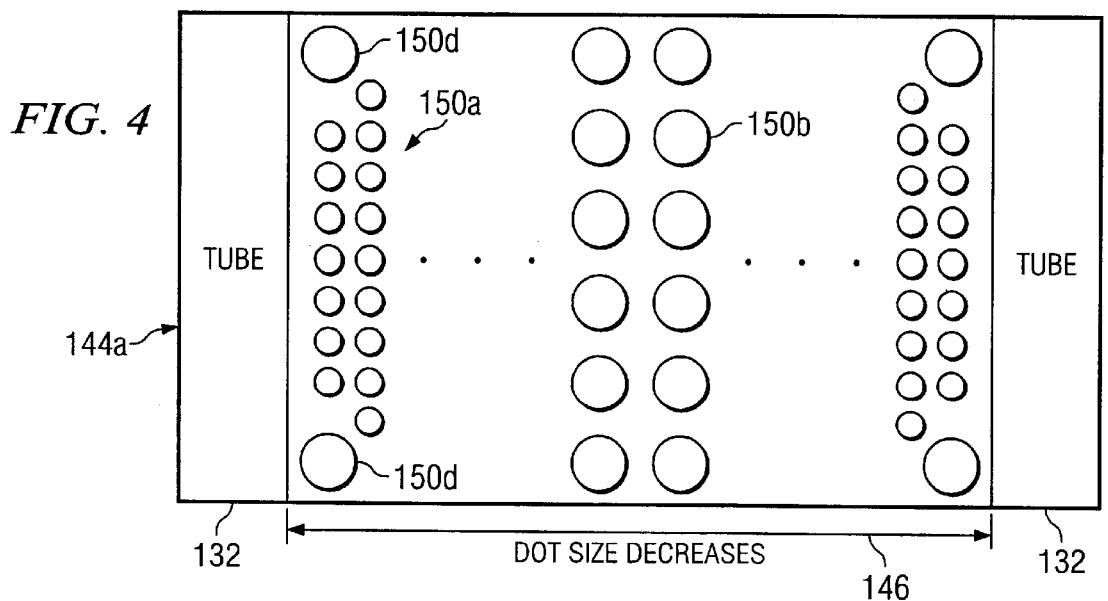
FIG. 4 illustrates an extraction pattern disposed on the surface area of a light pipe in accordance with embodiments of the present invention that use a two light sources.

FIG. 4 illustrates a top view of an exemplary extraction pattern 144a that can be applied to the bottom of light pipe 130 within display screen 210. The extraction pattern 144a is designed to uniformly illuminate the LCD layer 430, at any brightness. Extraction dots are applied directly to the lower surface of the light pipe 130. To accomplish this uniform distribution of light, extraction dots decrease in size in a proportion to their distance from the middle of the light pipe 130. Extraction dots 150a are smaller since they are relatively close to the light sources 132 and 136. Extraction dots 150b are slightly larger since they are relatively farther from to the light sources 132 and 136 than dots 150a. It is appreciated that extraction pattern 144a also includes larger sized dots 150d at the corners near the light source 132 because the tube 132 is not as bright at the ends as in the middle sections of the tube. Variations in the extraction dot patterns, which may be equally applied to the present invention, may be found in U.S. Pat. No. 5,593,221, by Evanickly et al., which is hereby incorporated by reference.

Figure 5:
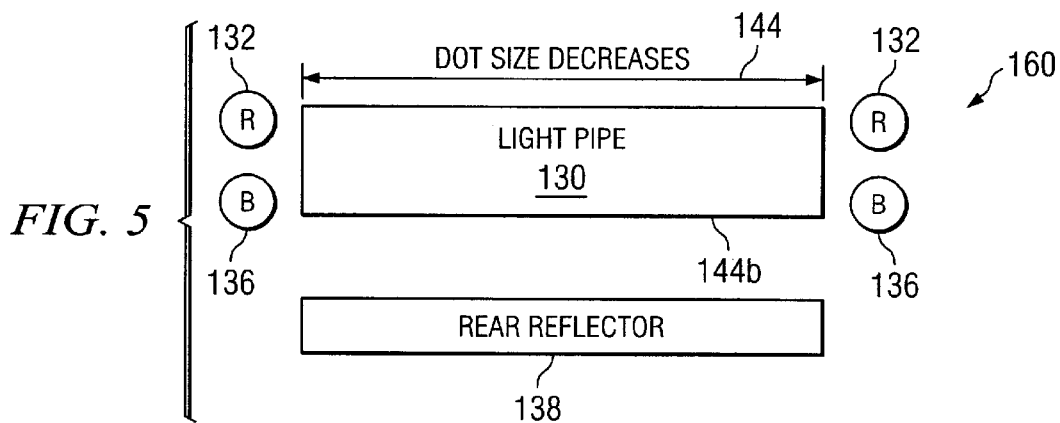
FIG. 5 illustrates a cross section of the lighting configuration of the LCD panel embodiment of FIG. 3 showing the orientation of the extraction patterns in accordance with the present invention.

FIG. 5 illustrates the lighting configuration 160 of light pipe and light sources (as shown for display 210 of, FIG. 3) taking into consideration the orientation of its light extraction pattern. Within display screen 210, extraction pattern 144 is designed to uniformly distribute light to the LCD layer 430, as the brightness of light sources 132 and 136 varies. Light extraction pattern 144 is, shown in FIG. 5 in cross section as a thin line applied to the underside of light pipe 130. As shown, the dot sizes decrease within pattern 144 from the middle of the light pipe 130 towards the edges of the light pipe 130.

Figure 6:
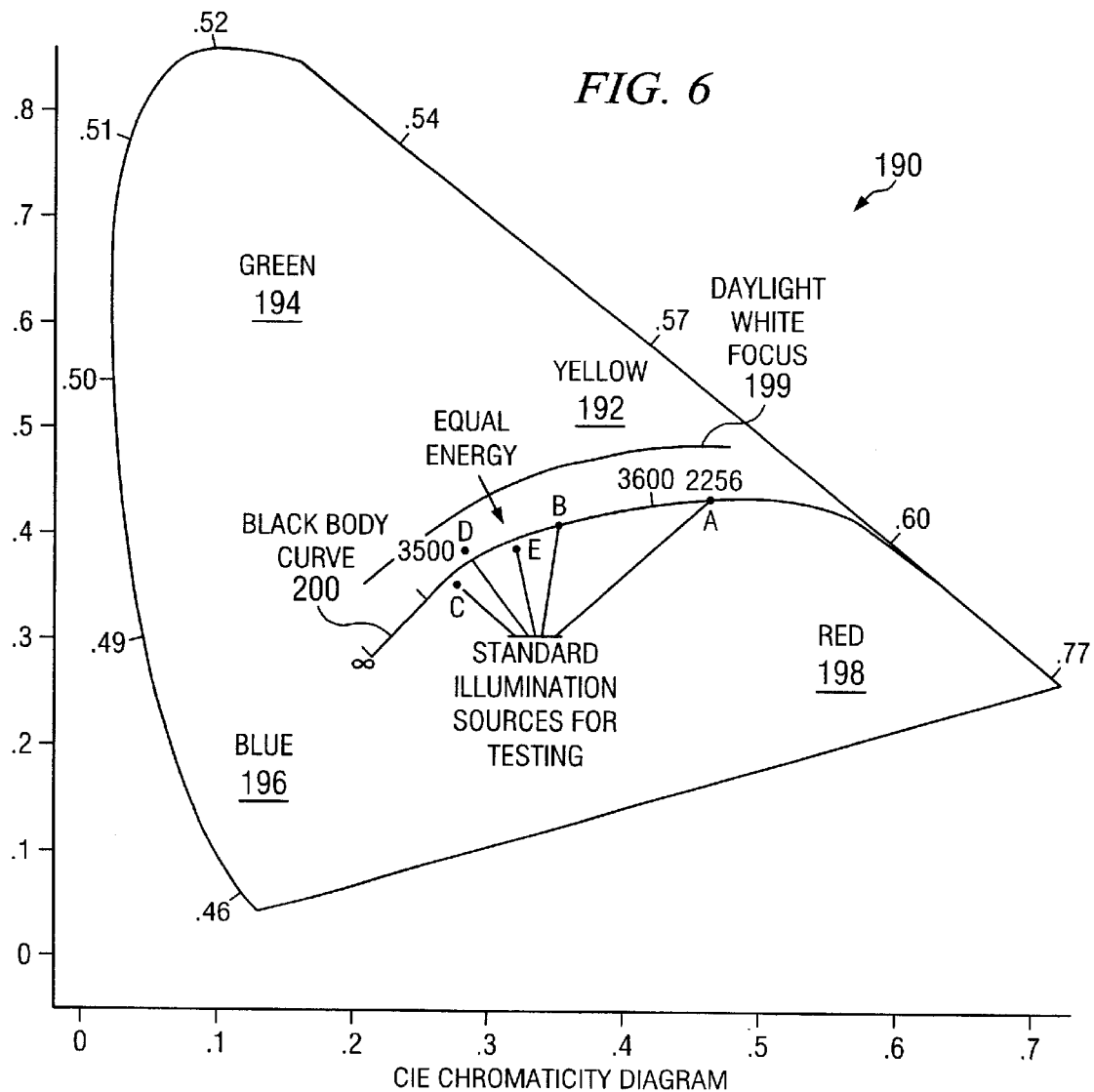
FIG. 6 illustrates the CIE chromaticity diagram including the black body curve and the daylight white locus.

FIG. 6 illustrates a CIE chromaticity diagram 190. In one embodiment of the present invention, when adjusting the intensities of light sources 132 and 136, the resultant color temperature substantially holds to the black body curve 200 of diagram 190. FIG. 6 illustrates a CIE chromaticity diagram 190 illustrating chromaticity coordinates along the horizontal and vertical. Within the diagram 190, the green portion 194 is toward the top with yellow 192 between green 194 and red 198. Blue 196 is toward the left. A black body curve 200 represents the chromaticity displayed by an ideal black body, typically approximated by a tungsten filament, heated to various degrees Kelvin. For instance, from point D to point A along curve 200, the curve represents the color emitted from the tungsten filament from 6,500 degrees K to 2856 degrees K. As shown, the blackbody curve 200 traverses from blue 196 to the red 198 without straying much into the yellow 192 or green 194 regions. In an alternative embodiment of the present invention, when adjusting the relative intensities of the light sources 132 and 136, the resultant color temperature substantially holds a Daylight White Locus 199. The Daylight White Locus 199, which is preferably used in the publishing industry, is roughly parallel to the Black Body Curve 200. However, the Daylight White Locus 199 is of a greater energy that the Black Body Curve 200, and, as illustrated in FIG. 6, has a larger green component.

The light sources 132 and 136 (FIG. 5) selected in accordance with the preferred embodiment of the present invention are those that illuminate with a color temperature that is near the Daylight White Locus 199 when their brightness is adjusted within a predetermined color temperature range (e.g., 5,000 to 7,000 K). That is, the color balancing system of the present invention allows adjustments to the color temperature of the flat panel display screen 210 that remain close to the Daylight White Locus 199.

Figure 7:
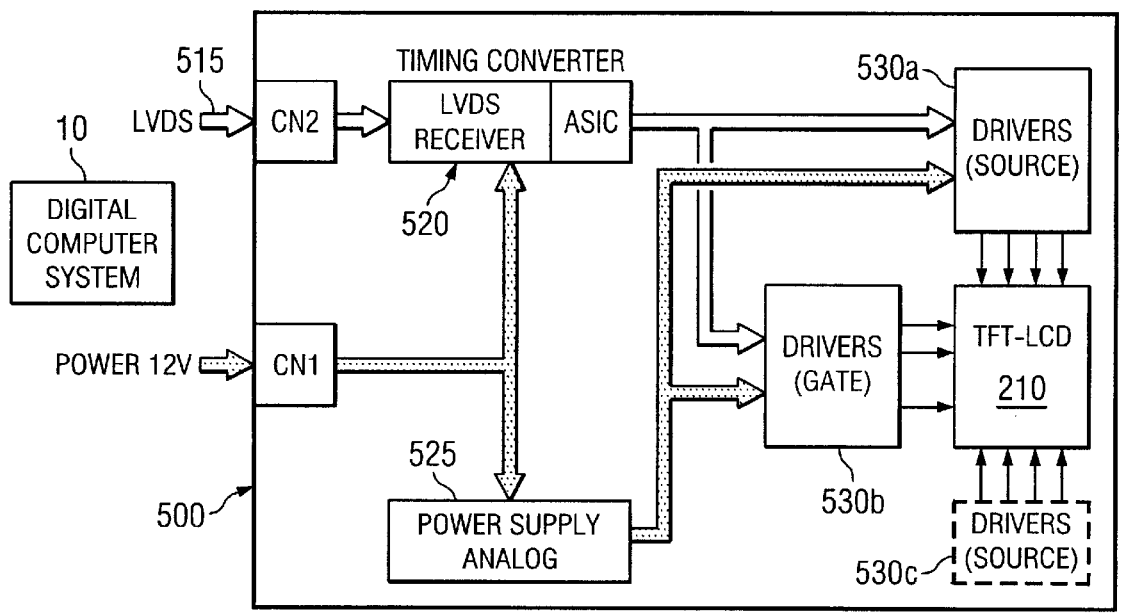
FIG. 7 illustrates an exemplary driver circuitry for the flat panel LCD monitor according to one embodiment of the present invention.

FIG. 7 illustrates LCD control board circuitry 500 used for driving the large screen wide aspect ratio, high resolution, display screen 210 of the present invention. Circuitry 500 is located within display monitor 216 (FIG. 2). Circuitry 500 receives signals from an information originating source, e.g., computer system 10 (FIG. 1) as shown in the configuration of FIG. 7. The digital computer system 10 generates display output signals (e.g., video output signals) which are compliant with the low voltage differential voltage signals (LVDS) video format and in one implementation are 85 MHz. These display signals are supplied over digital bus 515 to an LVDS receiver 520 which also contains timing converter circuitry. In order to provide sufficient bandwidth for rendering images on the wide aspect ratio monitor 216, in the present embodiment, a dual channel LVDS interface is used where video data is sent at the rate of two pixels for each LVDS output clock. The timing converter circuitry and the LVDS receiver 520 can be implemented using application specific integrated circuitry (ASIC) technology. The dual channel LVDS interface will be discussed in greater detail below.

Although LVDS signal standard is employed in one embodiment of the present invention, other signal transmission standards can also be used by the present invention for the display signal including emitter coupled logic (ECL) and transition minimized differential signaling (TMDS) technologies. It should be apparent to those of ordinary skill in the art, upon reading the present disclosure, that other signal transmitting standards having sufficient bandwidth and suitable for supporting a wide aspect ratio flat panel LCD screen may also be used.

An analog power supply 525 of FIG. 7 provides power signals to drivers 530a–530c for driving the flat panel display 210. Circuit 520 supplies the drivers 530a–530c with timing and data signals compliant with the LVDS signal format. The data signals include color data (RGB) for selectively updated rows of pixels of display screen 210. A pixel on display screen 210 includes one red, one green and one blue sub-pixel. The pixels are organized around red, green and blue stripes and have a uniform pixel pitch within display screen 210. In one embodiment, the pixel pitch is approximately 0.231 mm making display screen 210 approximately 17.3 inches long along the diagonal direction for a high resolution of 1,600 pixels horizontally by 1,024 pixels vertically.

Display screen 210 includes a selectively energized transistor layer 435 (FIG. 7) and each transistor corresponds to a color part of a pixel. Therefore, three transistors are used for each pixel. The rise time (tr) for the liquid crystal material in display 210 is 20 ms and the fall time (td) is 30 ms. Each transistor contains a source and a drain. The sources of each transistor are controlled by source driver circuitry 530a and optionally source driver 530c. The gates of each transistor are controlled by gate driver 530b. The display 210 is updated row by row with only one horizontal row of pixels being energized at any given time. All of the rows are energized within a video frame. Update formats can be interlaced or non-interlaced to produce a frame.

Figure 8:
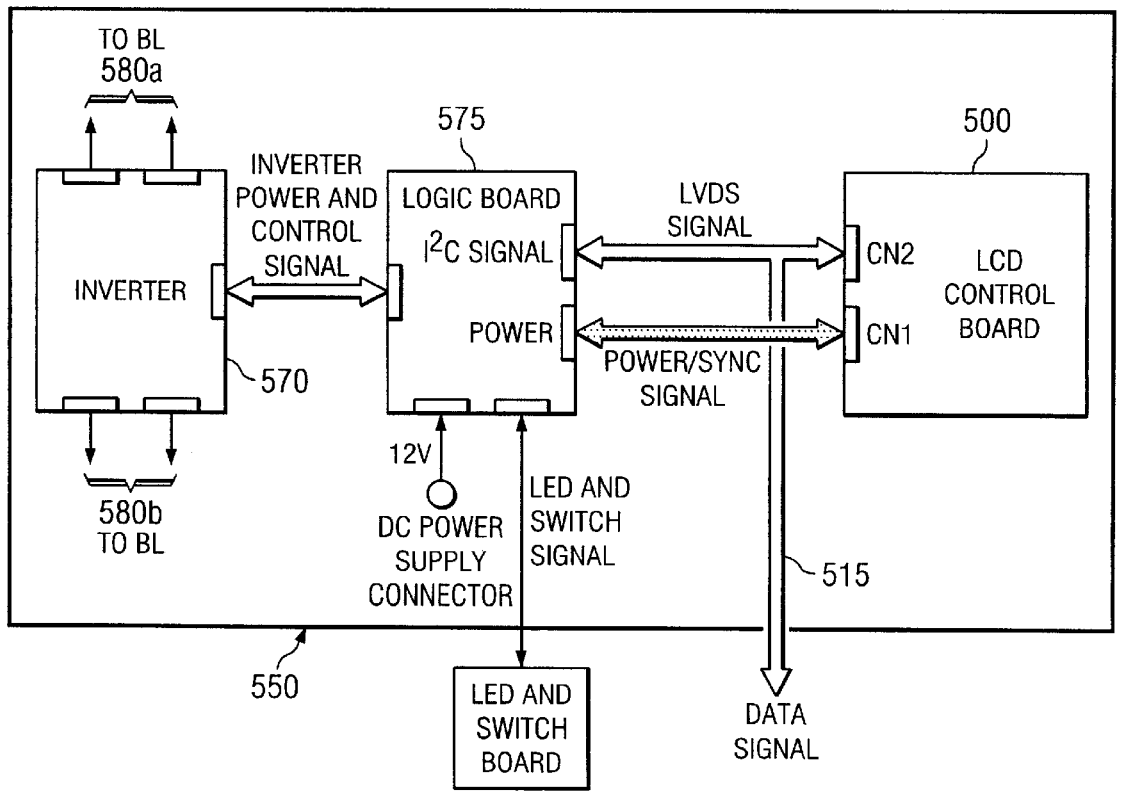
FIG. 8 illustrates an exemplary control logic for the monitor of one embodiment of the present invention including the exemplary driver circuitry of FIG. 7.

FIG. 8 illustrates further circuitry 550 used by the monitor 216 of the present invention. Circuitry 550 includes an LCD control board 500 as described in FIG. 7. Further, circuitry 550 includes the inverter circuits 570 used to control the light sources (e.g., 132 and 136, etc.) described above in the lighting configurations. The inverter circuitry 570 contains the provision for independently providing power to each light source (e.g., at an operating voltage of 745 volts with a striking voltage capability of 2,000 volts) thereby allowing independent dimming control of each light source. Each inverter circuit of 570 contains a transformer for supplying a high voltage signal to the light sources 132 and 136 and also contains a switch circuit for turning the tubes off. Light sources 132 and 136 are separately coupled to power supply lines 580a–580b. A return bus (not shown) contains a separate return lines from source 132 to one inverter and from source 136 to another inverters 175b. The current supplied to the inverter circuitry 570 is approximately 2 amps at 12 volts. Logic board 575 controls white balancing adjustments and monitors control signals applied to display 210 to ensure a proper timing interface. As described with respect to FIG. 7, the LVDS display signals over digital bus 515 originate from a digital computer system 10. Logic board 575 is also configured for receiving a white balance adjustment control signal from digital computer system 10. The data interface for controlling white-balance adjustment will be discussed in greater detail below.

Figure 9:
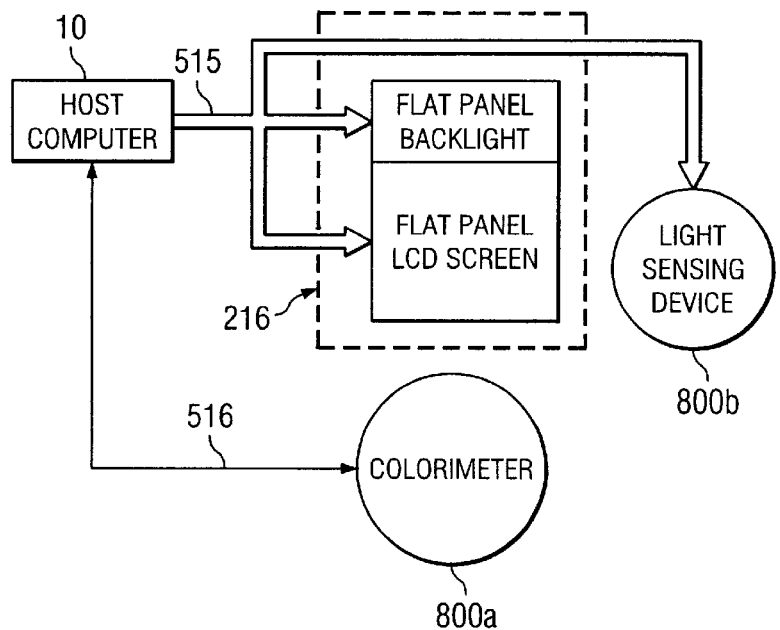
FIG. 9 illustrates an exemplary set up of the present system of providing independent white balance adjustment and gamma correction capabilities to a flat panel LCD monitor as illustrated in FIG. 2.

Graphics Subsystem and Electrical Interfaces for Providing Gamma Correction and White Balance Adjustment in the Flat Panel LCD monitor of Present Invention According to one embodiment of the present invention, the flat panel LCD monitor 216 is configured for coupling to a digital computer system to receive image data to be rendered, and to receive control signals such as white-balance adjustment control signals and power management control signals. In addition, in the present embodiment, the flat panel LCD monitor 216 is configured for coupling to an inexpensive light sensing device. FIG. 9 illustrates an exemplary set up of the present invention including computer system 10, flat panel LCD monitor 216, a color-measuring device, (or colorimeter) 800a, and an inexpensive light sensing device (or luminance sensor) 800b. As illustrated, calorimeter 800a is coupled to computer system 10 via serial port 17 for measuring precise optical characteristics (e.g color coordinates, color temperature) of the flat panel LCD monitor 216. In addition, luminance sensor 800b is coupled to host computer 10 via flat panel LCD monitor 216 and digital bus 515.

In the particular embodiment as illustrated in FIG. 9, display output signals (e.g. video output signals) are compliant with the low voltage differential voltage signal (LVDS) format, which will be discussed in detail below. These display output signals are supplied over a digital bus 515 to flat panel LCD monitor 216. White balance adjustment control signals are also supplied over digital bus 515 flat panel LCD monitor 216. However, white balance adjustment control signals are compliant with the inter-integrated circuit (I2C) format. As discussed above, flat panel backlight control circuitry 575 is responsive to the white balance adjustment control signals to alter a net color temperature of the backlight by independently varying the intensities of light sources 132 and 136 (FIG. 5).

In the present embodiment, calorimeter 800a is a sophisticated tri-stimulus color sensor capable of reading precise color coordinates and color temperature of the flat panel LCD monitor 216. Luminance sensor 800b, on the other hand, is only capable of detecting luminance level, or brightness of the flat panel LCD monitor 216. Tri-stimulus color sensors and luminance sensors are well known in the art of color calibrating CRT displays. Therefore, details of the calorimeter 800a and the luminance sensor 800b are not described herein to avoid obscuring aspects of the present invention.

Significantly, colorimeter 800a is configured for measuring precise optical characteristics (e.g luminance values, color temperature, color coordinates) of flat panel LCD screen 210. In the present embodiment, optical characteristics measurement data are transmitted to computer system 10 via serial bus 516, and are stored in volatile memory 14 and data storage device 15 of computer system 10. The stored data will then be used for profiling the flat panel LCD monitor 216. The process of profiling the flat panel LCD monitor 216 using the precise optical characteristics measurement data will be discussed in detail below. In the present embodiment, signals for controlling and initializing light sensing device 800 are also transmitted across serial bus 516.

Luminance sensor 800b, unlike colorimeter 800a, is only configured for measuring luminance level, or brightness, of flat panel LCD screen 210. Luminance sensor 800b is controlled by host computer 10 via digital bus 515. In addition, luminance data measured by luminance sensor 800b are transmitted back to the host computer 10 for storage and analysis. The luminance data will then be used for calibrating the flat panel LCD monitor 216. The process of calibrating the flat panel LCD monitor 216 using the luminance data will be discussed in detail below. One advantage of using the luminance sensor 800b for calibrating the flat panel LCD monitor 216 is that luminance sensors are relatively inexpensive compared to calorimeters. It should be noted that, in other embodiments of the present invention, colorimeter 800a may be used for calibrating flat panel display screen 210.

Figure 10:
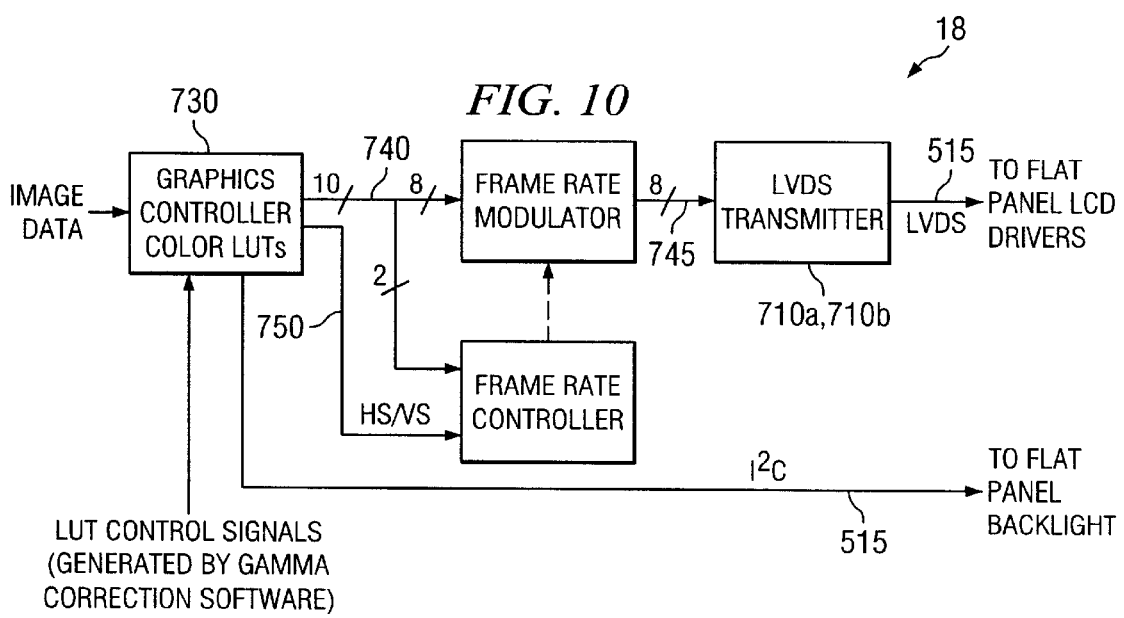
FIG. 10 is a block diagram of graphics subsystem of FIG. 1 in furtherance of one embodiment of the present invention.

FIG. 10 is a block diagram of graphics subsystem 18 (FIG. 1) in furtherance of one embodiment of the present invention. As illustrated, graphics subsystem 18 comprises a graphics controller 730, a frame rate modulator 770, a frame rate controller 780, and LVDS transmitters 710a and 710b. Graphics controller 730 is coupled to frame rate modulator 770 by data bus 740, and is coupled to frame rate controller 780 by data bus 740 and data bus 750. Frame rate controller 780 is also coupled to control frame rate modulator 770. In addition, LVDS transmitters 710a and 710b are also coupled to receive RGB data from frame rate modulator 770. In the particular embodiment as shown, graphics controller 730 is configured to control a flat panel backlight of flat panel monitor 216 via an I2C interface.

In operation, graphics controller 730 receives image data and LUT control signals from processors 12 and converts the image data to appropriate RGB values using graphics rendering engines. A color look-up table is provided to match a specific gamma response. In the particular embodiment as illustrated, graphics controller 730 is configured for generating RGB values each including 10 bits (bit 0 to bit 9). Hence, bus 740 is 30-bit wide. The 2 least significant bits (LSBs) of each of the RGB values, however, together with horizontal synchronization (HS) and Vertical synchronization (VS) signals, are transmitted to frame rate controller 780 to control frame rate modulator 770. The remaining 8 bits of each of the RGB values (e.g bit 2 to bit 9) are provided to frame rate modulator 770 to be frame rate modulated. Frame rate modulation is a well known technique for generating an intermediate gray scale value by rapidly alternating between neighboring grayscale values in CRT displays. As such, implementation details of the frame rate modulator 770 and frame rate controller 780 are not described here in detail so as to avoid obscuring aspects of the present invention.

The frame rate modulated RGB values are provided to LVDS transmitters 710a and 710b via data bus 745. LVDS transmitters 710a and 710b then converts the frame rate modulated RGB values into LVDS compliant data format to be transmitted to flat panel LCD monitor 216. It is appreciated that, in the particular embodiment as illustrated, frame rate modulator 770 and frame rate controller 780 are implemented within graphics subsystem 18 of computer system 10. However, it should be apparent to those ordinarily skilled in the art, upon reading the present disclosure, that frame rate modulator 770 and frame rate controller 780 may be implemented in flat panel LCD monitor 216. However, in that embodiment, transmission protocols having a very large bandwidth would be necessary for transmitting the RGB values to flat panel LCD monitor 216. Graphics controller 730 is also configured for receiving LUT control signals generated by gamma correction software of the present invention to modify the gamma of the LUT.

Figure 11A:
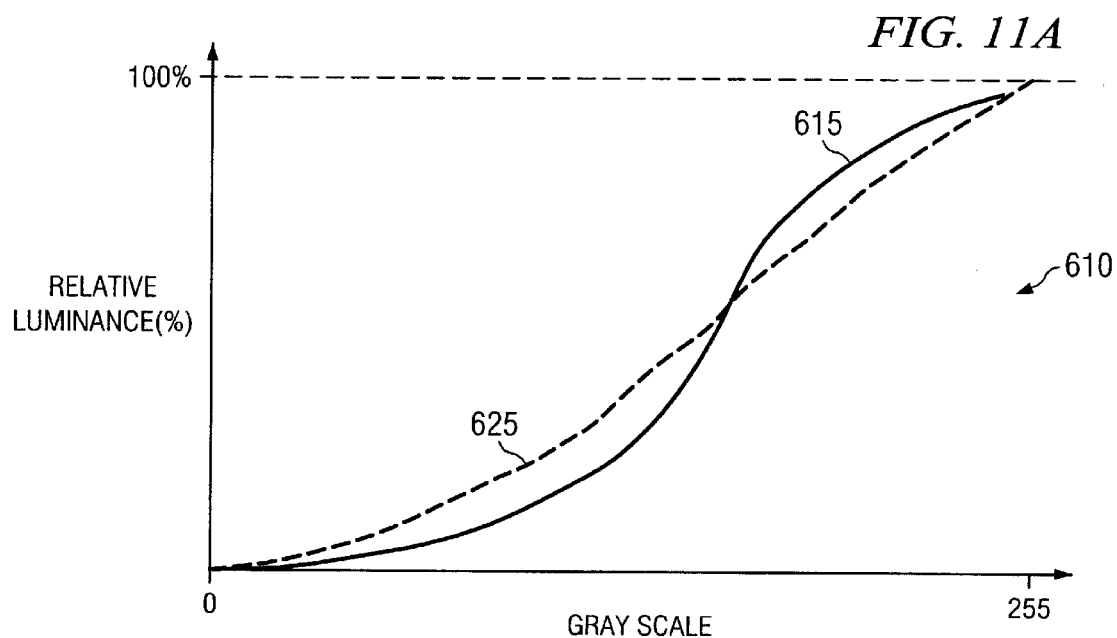
FIG. 11A illustrates uncorrected voltage response curve of a typical twisted nematic liquid crystal layer of a liquid crystal display screen according to one embodiment of the present invention.

In addition to generating intermediate colors, frame rate modulation technique is applied in the present embodiment to reduce visual artifacts caused by "scalloping." The problem of "scalloping" is endemic to liquid crystal displays using nematic liquid crystal molecules. FIG. 11A illustrates uncorrected voltage response curve 615 of a typical nematic liquid crystal layer of a liquid crystal display screen. Also illustrated is gamma curve 625 representing an ideal relationship between relative luminance of the LCD layer and grayscale data. As illustrated, voltage response curve 615 is not linear owing to the threshold response nature of twisted nematic liquid crystal material. Due to this non-linearity, a breakup in the smooth transition from one grayscale to another will be resulted. In order to remedy this problem, manufacturers of LCD modules sometimes configure LCD source drivers (e.g. drivers 530a, 530b and 530c of FIG. 7) to generate fixed voltages in response to several specific grayscale values. For example, a LCD source driver, which normally generates a voltage level of 0.04 volts in response to a grayscale value of 2, may be hardwired (or "pinned") to generate a voltage level of 0.78 volts in response to the grayscale value of 2. In this way, a nearly linear relationship between relative luminance and grayscale would be achieved.

Figure 11B:
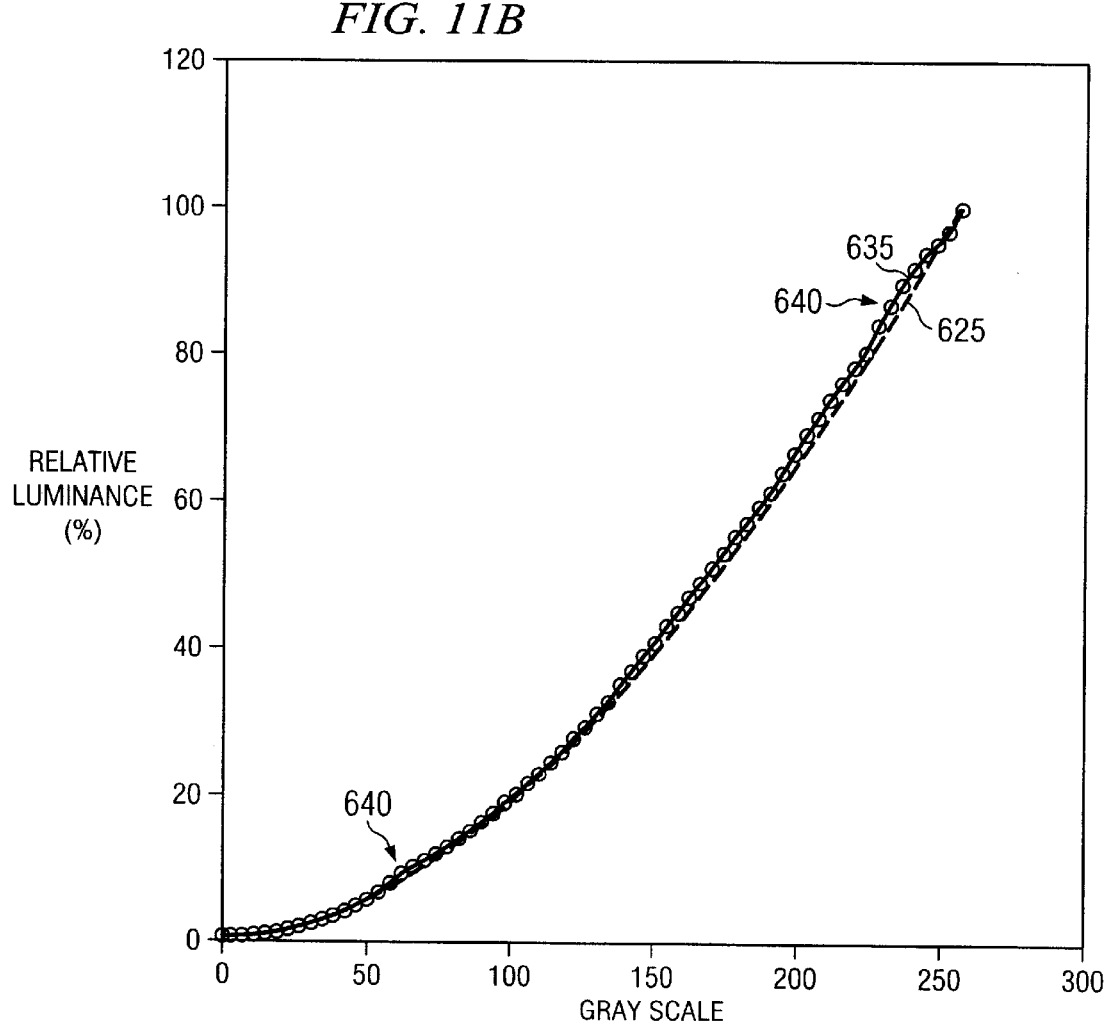
FIG. 11B illustrates the "scalloping" effect in the luminosity-grayscale relationship caused by the "pinning" particular voltages of the LCD source drivers.

FIG. 11B illustrates the "scalloping" effect caused by the "pinning" particular voltages of the LCD voltage drivers. As illustrated, curve 635 is a voltage response curve of a typical nematic liquid crystal layer of a liquid crystal. display screen. Curve 635 generally follows ideal relationship 625. Thus, the aforementioned problem of unevenness in the transition of one grayscale to another becomes less noticeable. However, curve 635 includes multiple "scallops" 640 or unevenness, which, if uncorrected, will cause slight deviations from the ideal color characteristics. These slight deviations, while mostly unnoticeable to users of flat panel LCD monitors, are significant during monitor calibration and profiling. These slight deviations, according to one embodiment of the present invention, may be substantially removed by the application of the frame rate modulation techniques. As described above, frame rate modulation techniques are well known in the art. Therefore, it should be apparent to those having ordinary skill in the art, upon reading the present disclosure, that "scalloping" effects can be eliminated using frame rate modulator 770 and frame rate controller 780 without reducing the dynamic range of the LCD monitor 216's gamma response.

Figure 12:
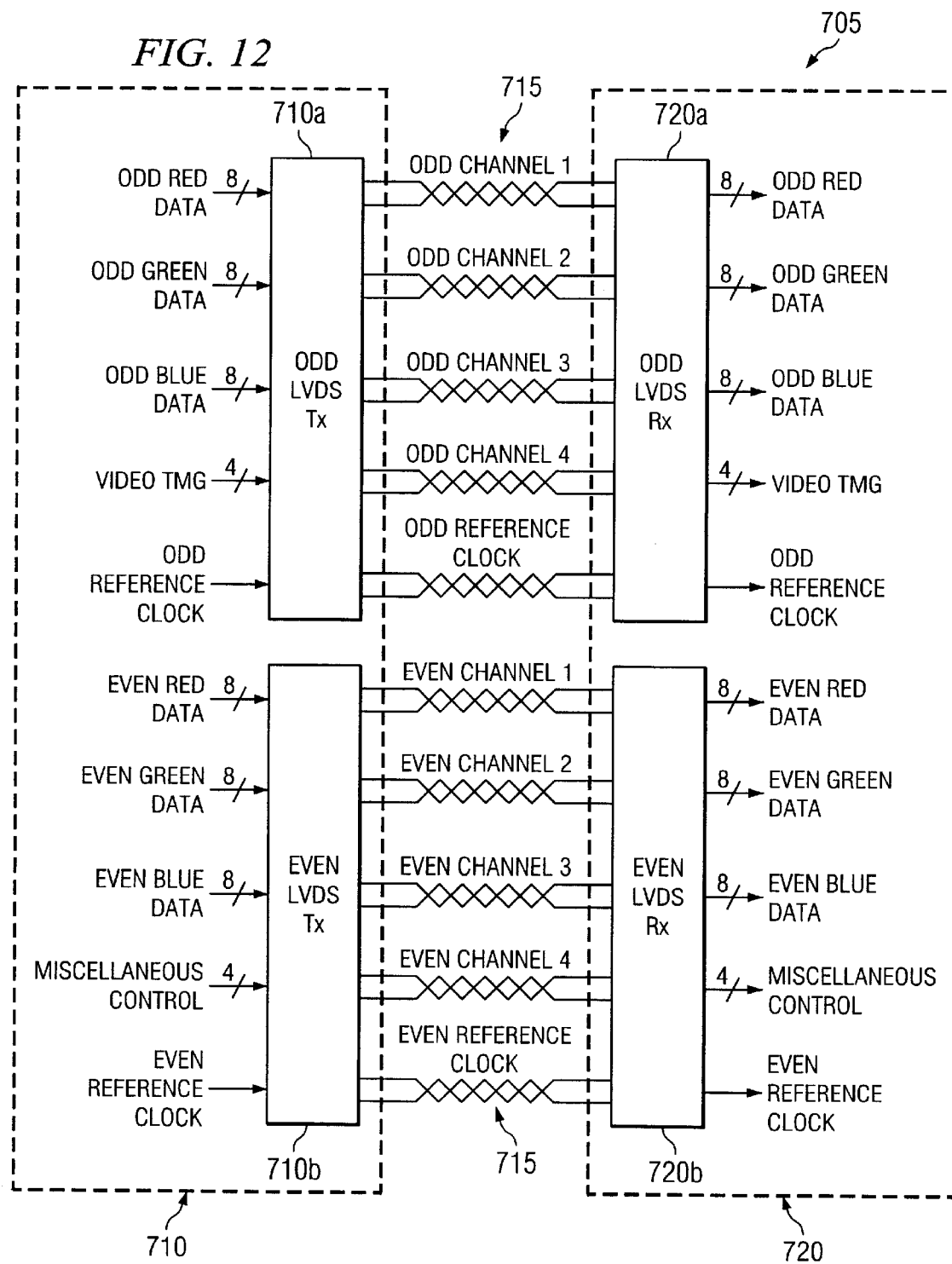
FIG. 12 illustrates an exemplary LVDS implementation of the digital video signal interface according to one embodiment of the present invention.

FIG. 12 illustrates an exemplary LVDS implementation of the digital video signal interface 705 between computer system 10 and flat panel LCD monitor 216 according to one embodiment of the present invention. As illustrated, 24 bits of digital video data (RGB data) and up to five timing and control signals are sent from computer system 10 to flat panel LCD monitor 216 through ten pairs of twisted wire 715 using LVDS technology compatible with TIA/EIA-644 LVDS standards. In the present embodiment, the five control signals are HS (horizontal sync), VS (vertical sync), DENA (Data-Enable) used for video timing, and two generic control signals. Particularly, video data (RGB data) are sent to the display through the LVDS interface at a rate of two-pixels-per-clock, each pixel being composed of a red, green, and blue component each being 8 bits wide. This scheme provides sufficient bandwidth for supporting a display having a screen resolution of 1920×1200 at 60 hz.

Further, as illustrated in FIG. 12, digital video interface 705 includes an ODD LVDS channel comprising ODD LVDS transmitter 710a and ODD LVDS receiver 720a. The ODD LVDS channel is dedicated for ODD RGB data (e.g. pixel 1, pixel 3, pixel 5, etc.) and timing signals HS, VS, and DENA. Digital video interface 705 also includes an EVEN LVDS channel comprising EVEN LVDS transmitter 710b and EVEN LVDS receiver 720b. The EVEN LVDS channel is dedicated for EVEN RGB data (e.g pixel 2, pixel 4, pixel 6, etc.) and the two generic, control signals CTL1 and CTL2. It is appreciated that the digital video interface 705 illustrated in FIG. 12 is exemplary only. It should be apparent to those having an ordinary skill in the art that the digital video interface may be implemented using other schemes as well.

Figure 13:
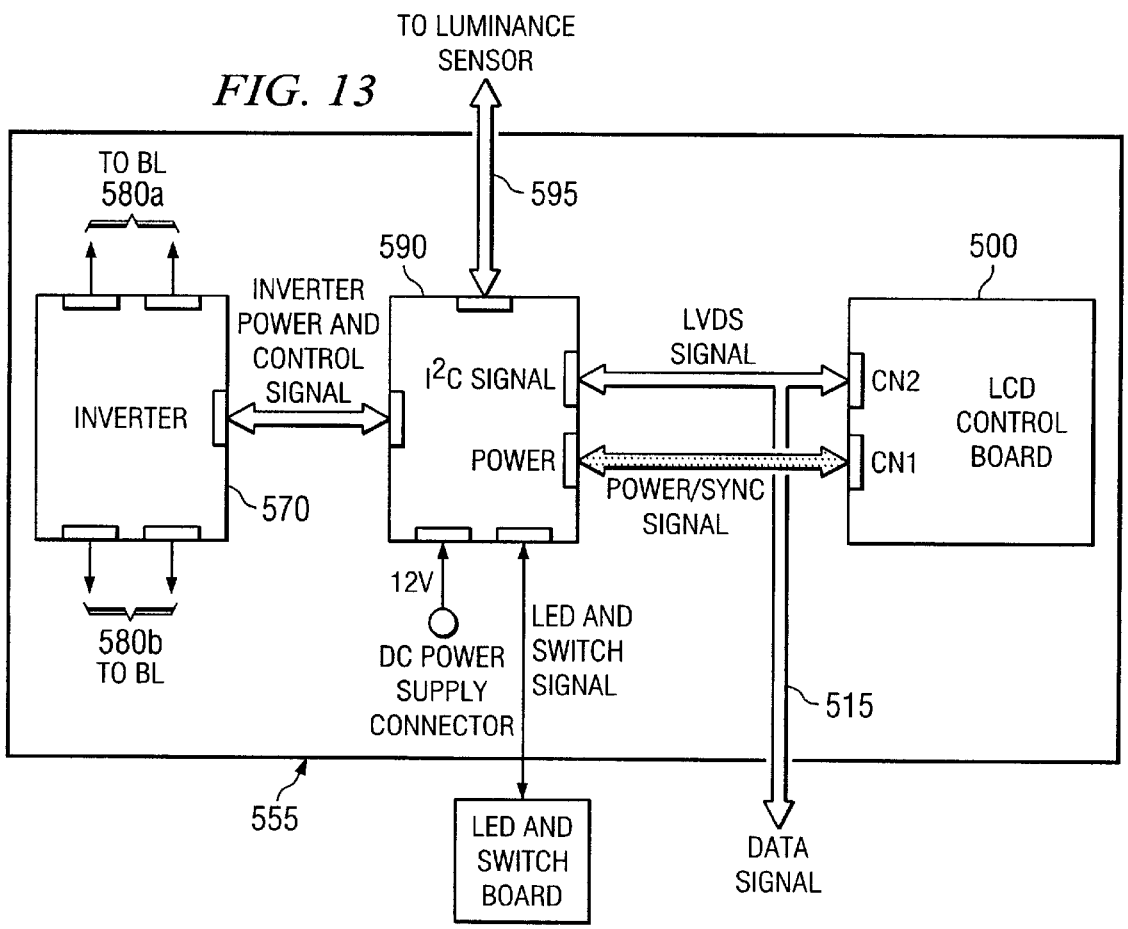
FIG. 13 illustrates driver circuitry for the wide aspect ratio flat panel display according to another embodiment of the present invention.

FIG. 13 illustrates driver circuitry 555 of monitor 216 according to another embodiment of the present invention. Circuitry 555 includes an LCD control board 500 as described in FIG. 7. Further, circuitry 555 includes the inverter circuits 570 used to control relative intensities of the light sources (e.g., 132 and 136, etc.) described above. Logic board 590 controls white balancing adjustments and also monitors timing signals within the LVDS video format for the purpose of power management. In the particular embodiment as illustrated, logic board 590 further comprises an I2C interface for coupling to luminance sensor 800b (FIG. 9). In this way, luminance data may be transmitted from luminance sensor 800b to computer system 10 via flat panel LCD monitor 216 and digital bus 515. As, described with respect to FIG. 8, logic board 590 is also configured for receiving a white balance adjustment control signal from computer system 10 via digital bus 515.

LCD Safe Colorimeter and Luminance Sensor for Measuring Optical Characteristics of the Flat Panel LCD Monitor of the Present Invention Conventional calorimeters utilize suction cups for providing a light tight attachment to a CRT screen during color calibration. However, suction cups, when attached to an LCD display screen such as LCD screen 210, may cause a slight bowing in the glass layer resulting in a thickness differential in nematic LCD layer. This "bowing" effect is highly undesirable because the TFT layer and LCD layer of an LCD screen may be easily damaged. Moreover, when a LCD layer is bowed, its optical properties are dramatically changed, causing the resultant colors to be dramatically aberrated. Consequently, using suction-type colorimeters on flat panel LCD monitor 216 will introduce significant errors in the measurements of the optical characteristics during color calibration.

Figure 14A:
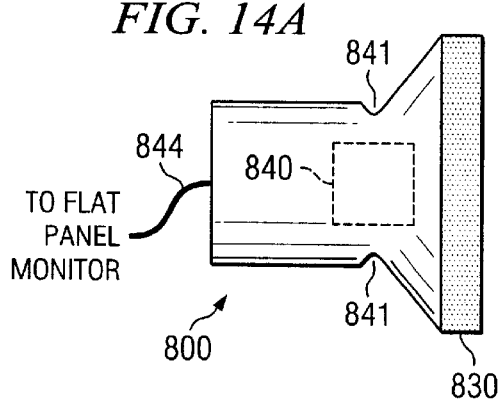
FIG. 14A illustrates a side view of one embodiment of an LCD-safe light sensing device for measuring the optical characteristics of the flat panel LCD monitor according to the present invention.
Figure 14B:
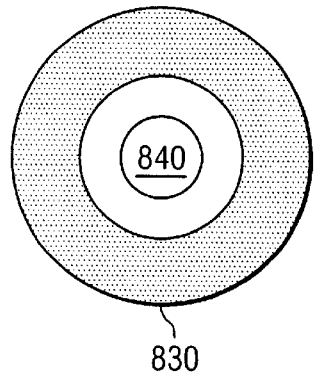
FIG. 14B illustrates a front view of one embodiment of an LCD-safe light sensing device for measuring the optical characteristics of the flat panel LCD monitor according to the present invention.

The LCD safe light sensing device 800 (e.g calorimeter 800a and luminance sensor 800b) as illustrated in FIGS. 14A and 14B overcomes such undesirable effects by avoiding the use of suction cups for attaching to the flat panel LCD screen 210. FIGS. 14A and 14B illustrate a side view and a front view, respectively, of LCD safe light sensing device 800 according to the present embodiment. As illustrated, light sensing device 800 includes a housing 842 for containing light sensors 840, a shroud 830, and a cable 844 protruding from housing 842. Light sensor 840 may comprise a sophisticated tri-stimulus sensor or a simple luminance meter. Preferably, shroud 830 is made of a soft rubber foam material for providing a light tight environment for light sensors 840 without causing significant "bowing" in the flat panel display screen 210. In addition, light sensing device further includes a channel 841 for coupling to non-suction type mounting means.

Figure 14C:
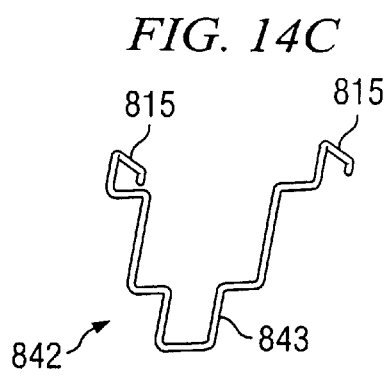
FIG. 14C illustrates a hanger for mounting light sensing device 800 to flat panel LCD screen according to one embodiment of the present invention.

FIG. 14C illustrates a hanger 842 for mounting light sensing device 800 to flat panel LCD screen 210 according to one embodiment of the present invention. Hanger 842 includes J-shaped arms 815 for coupling to a top portion of flat panel LCD monitor 216. In addition, hanger 842 further comprises a U-shaped portion 843 for securely receiving channel 841 of light sensing device 800.

Figure 14D:
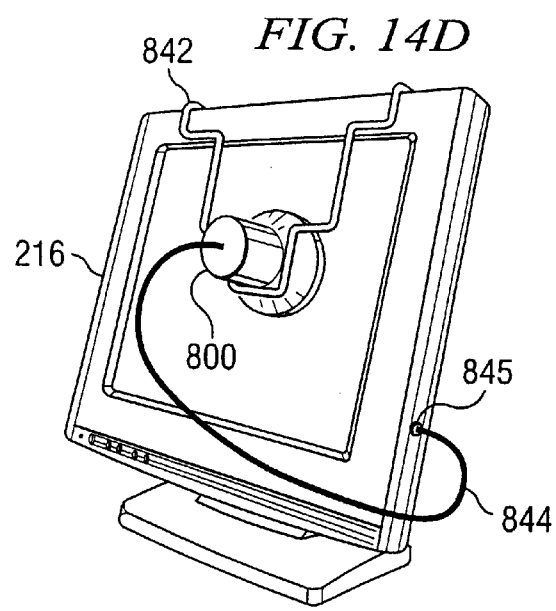
FIG. 14D illustrates a luminance sensor mounted to flat panel monitor using hanger according to the present embodiment.

FIG. 14D illustrates a luminance sensor 800b mounted to flat panel monitor 216 using hanger 842 according to the present embodiment. As illustrated, luminance sensor 800b is rested in the U-shaped portion 843 of hanger 842. In addition, J-shaped arms 815 are securely attached to a top portion of flat panel monitor 216. In this way, shroud 830 is lightly pressed against flat panel LCD screen 210 to prevent ambient light from interfering with the monitor calibration process. FIG. 14D also shows an input jack 845 in flat panel LCD monitor 216 for receiving luminance data via cable 844 of light sensing device 800. Significantly, the present embodiment enables optical characteristics of the flat panel LCD screen 210 to be accurately measured. It should be appreciated that the light sensing device 800 and the attachment means 842 as illustrated in FIGS. 14A, 14B, 14C, and 14D are exemplary only. It should be apparent to those of ordinary skill in the art upon reading the present disclosure, that many other embodiments of an LCD safe light sensing device which do not cause color aberration in the LCD screen may also be used.

It should also be noted that while the LCD screen 210 of the present embodiment contains no safeguards to prevent "bowing" caused by a suction-type attachment device, it includes features that resist compressive forces. In the present embodiment, these features are in the form of beads or rods whose minor axes dimensions are equal to the ideal liquid crystal material thickness of the cell (e.g. 4 to 5 micrometers). These "spacer" materials are positioned in between the front glass (e.g front glass 420) and back glass (e.g back glass 440) of the LCD screen 210 before assembly. Any compressive force which tends to compress the spacing between these two glasses will be resisted by the spacer beads or rods. Consequently, the slight pressure exerted by shroud 830 on the LCD screen 210 would not materially affect its optical characteristics.

Mechanisms for White Balance Adjustment and Gamma Correction for Flat Panel LCD Monitors An important feature of the flat panel LCD monitor 216 of the present invention is that it may be color calibrated. A color calibrated flat panel LCD monitor is particularly useful for color critical applications such as pre-press soft proofing, desktop publishing, graphics design, medical imaging, and digital photography and video editing, etc., which require color temperatures and gamma values of different displays to be precisely matched in order to accurate view and exchange images with confidence. In order to perform such calibration accurately and automatically, the present invention provides mechanisms for white balance adjustment and gamma correction for flat panel LCD monitors. In the present embodiments, color correction software programs stored in host computer 10, and light sensing devices are, used to accomplish the tasks of calibrating flat panel LCD monitors to a desired set of optical characteristics.

Figure 15:
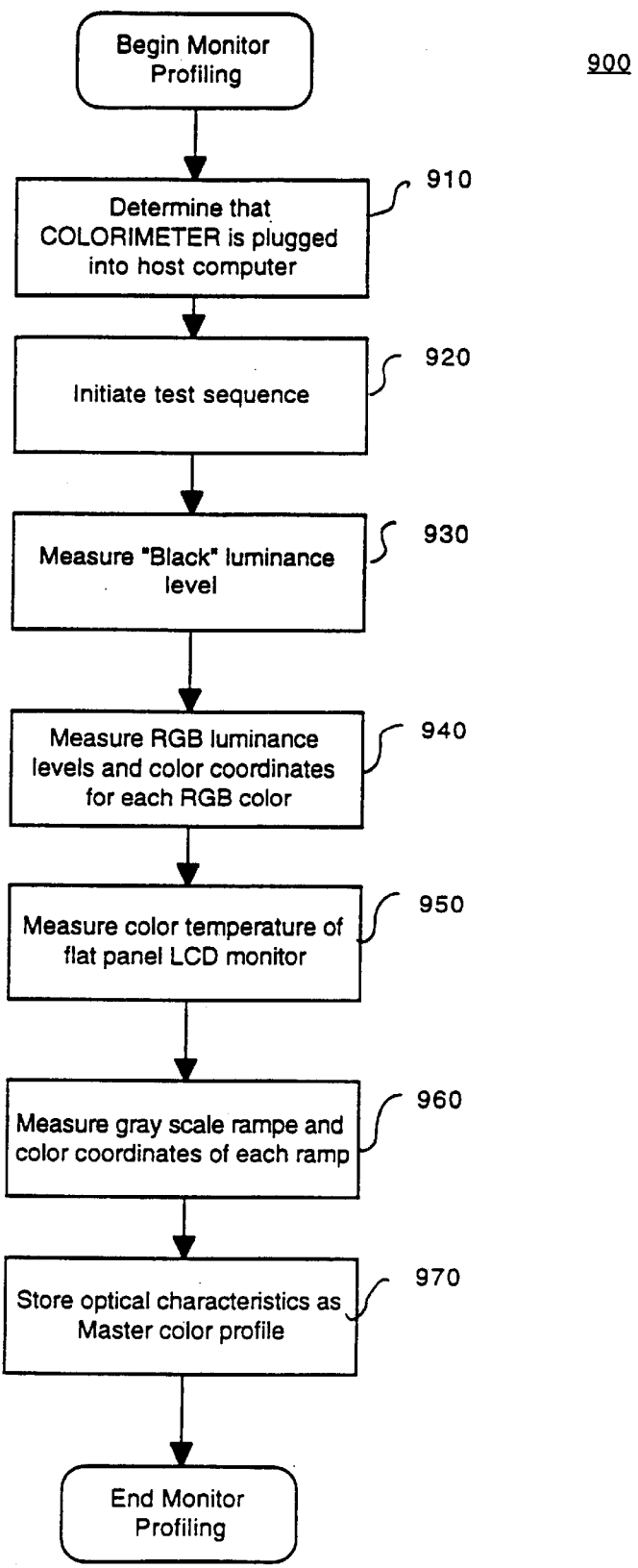
FIG. 15 is a flow diagram illustrating the processing of profiling a flat panel LCD monitor according to one embodiment of the present invention.

FIG. 15 is a flow diagram 900 illustrating the processing of color profiling a flat panel LCD monitor according to one embodiment of the present invention. In the present embodiment, color profiling is performed with an expensive tri-stimulus colorimeter such as calorimeter 800*a* (FIG. 9). Expensive tri-stimulus calorimeters such as calorimeter 800*a* are capable of precisely measuring the color coordinates of different colors displayed on the screen, and color temperatures of the screen. Further, the expensive calorimeter used is configured for mounting on a flat panel LCD screen with non-suction type attachment means as described in FIGS. 14A to 14D.

With reference now to FIG. 15, at step 910, host computer 10 determines whether calorimeter 800*a* is properly plugged in. In the present embodiment, colorimeter 800*a* is configured for coupling to a serial port 17 of host computer 10. Methods for determining whether a peripheral device is properly plugged into a serial port are well known in the art, and are therefore not described herein to avoid obscuring aspects of the present invention.

At step 920, a test sequence is initiated. The initialization process may include completely shutting off the backlight of the flat panel LCD monitor such that a "pure" black color (or zero luminance level) may be determined by, the calorimeter 800*a*. It should be noted that this zero luminance level is different from the "black" luminance level of a LCD screen with the backlight turned on. Further, the initialization process may include other well known self-testing steps to ensure that the calorimeter 800*a* is working properly.

At step 930, with the backlight "on," a black luminance level of the LCD screen is measured by the colorimeter 800*a*. Black luminance data will then be used for calculating the contrast ratio of the display.

At step 940, after the calorimeter 800*a* is initialized, an image or a series of images of known RGB values are displayed on the LCD screen. Colorimeter 800*a* is then used to measure the optical characteristics, such as luminance level and color coordinates of each RGB colors displayed on the LCD screen. The results of the measurements are transmitted from the calorimeter back to the host computer system. As discussed above, according to one embodiment of the present invention, optical characteristics data of the flat panel LCD screen may be transmitted back to the host computer system via a serial bus.

At step 950, the color temperature of the LCD screen is measured by the calorimeter. Color temperature of the LCD screen is preferably determined by measuring the color temperature of "pure" white displayed on the LCD screen, i.e. all data levels of each R, G and B component set to "high." Color temperature data are also transmitted back to the host computer system via a serial bus.

At step 960, the grayscale ramps for each of the RGB primaries are determined. The grayscale ramps are determined by measuring a plurality of equally spaced grayscale points for each of the RGB primaries at the LCD screen. For instance, the luminance levels for 32 equally spaced grayscale levels may be measured and used to construct a gamma curve of the LCD screen. Grayscale ramp data are then used by the host computer to determine a gamma value of the LCD display screen using well known methods and algorithms.

At step 970, optical characteristics data of the LCD screen, such as color temperature, black luminance level, gamma, color coordinates of the RGB primaries, are stored in the host computer in a Master color profile. The color profile may be used to calibrate the LCD screen periodically such that the display's color characteristics may remain consistent over time. In other embodiments of the present invention, the color profile may be transmitted across a computer network, such as the World Wide Web, to other computers having color calibratable displays. In those embodiments, the color profile is used as a reference such that other monitors may be calibrated to the exact color characteristics of the "master" LCD screen. In other embodiments, the color profile may be used to perform screen-to-paper or screen-to-film color matching.

Figure 16:
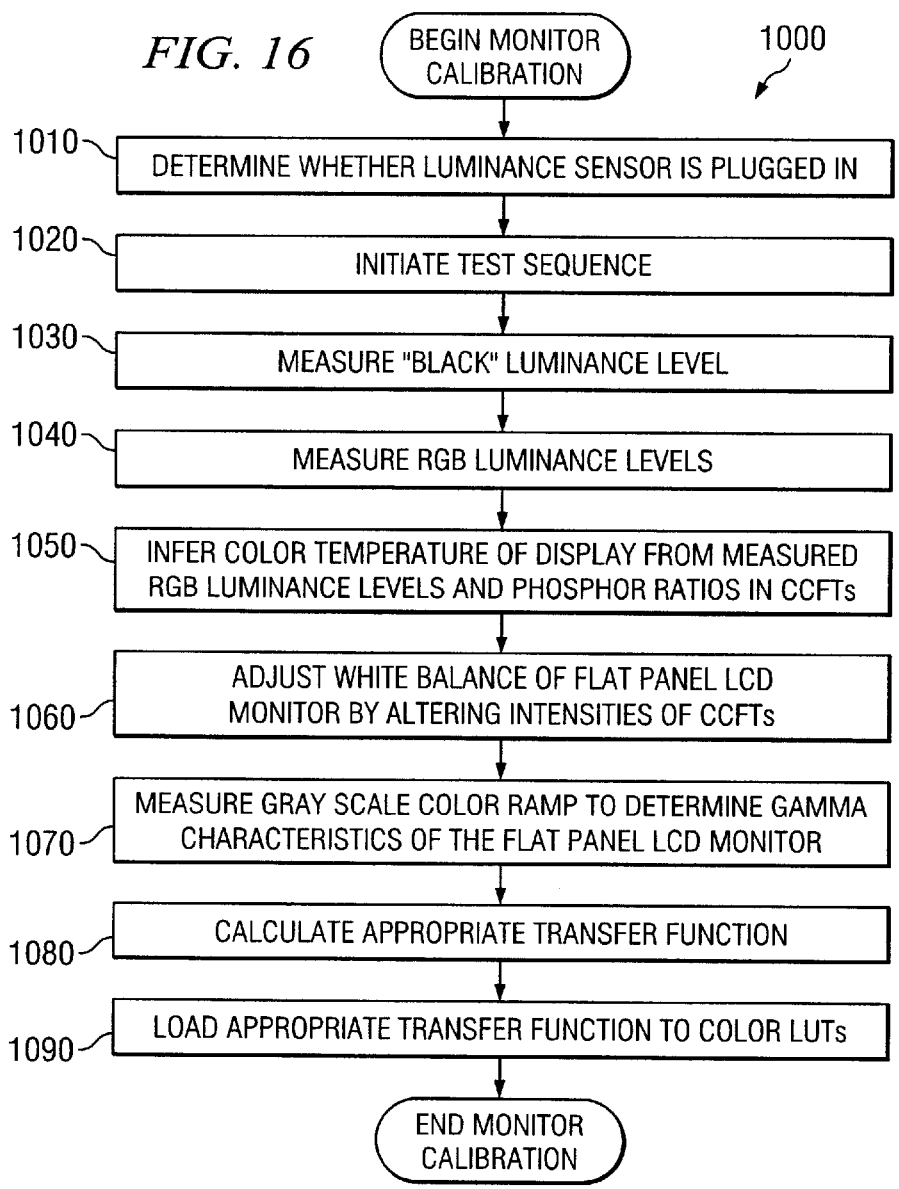
FIG. 16 is a flow diagram illustrating the process of calibrating a flat panel LCD monitor according to one embodiment of the present invention.

With reference now to FIG. 16, at step 1010, host computer 10 determines whether luminance sensor 800*b* is properly plugged in. In the present embodiment, luminance sensor 800*b* is configured for coupling to an I2C interface of the flat panel LCD monitor. Methods for determining whether a peripheral device is properly plugged into an I2C bus are well known in the art, and are therefore not described herein to avoid obscuring aspects of the present invention.

At step 1020, a test sequence is initiated. The initialization process may include completely shutting off the backlight of the flat panel LCD monitor such that a "pure" black color (or zero luminance level) may be determined by the luminance sensor 800*b*. It should be noted that this zero luminance level is different from the "black" luminance level of a LCD screen with the backlight turned on. Further, the initialization process may include other well known self-testing steps to ensure that the luminance sensor 800*b* is working properly.

At step 1030, with the backlight "on," a black luminance level of the LCD screen is measured by the luminance sensor 800*b*. Black luminance data will then be used for calculating the contrast ratio of the LCD screen.

At step 1040, after the luminance sensor 800*b* is initialized, an image or a series of images of known RGB values are displayed on the LCD screen. Luminance sensor 800*b* is then used to measure the luminance level of each RGB primaries displayed on the LCD screen. The results of the measurements are transmitted to the host computer system. As discussed above, according to one embodiment of the present invention, luminance data of the flat panel LCD screen may be transmitted back to the host computer system via a digital connection, such as digital bus 515, between the flat panel LCD monitor and the host computer.

At step 1050, the color temperature of the LCD screen is inferred from the luminance data measured by the luminance sensor. In the present embodiment, color temperature may be inferred from luminance data and provided that the phosphor ratios in the light sources (e.g light sources 132 and 136) are known. The algorithm for calculating color temperature from luminance data of RGB primaries and known phosphor ratios in the light sources are well known in the art. Therefore, the intricate algorithms for performing such estimation are not described herein to avoid obscuring aspects of the present invention.

At step 1060, the color temperature of the LCD screen obtained from step 1050 is compared to a reference color temperature value. Relative intensities of the blue and red light sources of the backlight are then adjusted according to any discrepancies between the calculated color temperature and the reference color temperature value. In the present embodiment, the reference color temperature is contained in a color profile stored in the host computer. The color profile may be provided by the manufacturer of the flat panel LCD monitor. Alternatively, the color profile may be created by the profiling process described above with respect to FIG. 15. For screen-to-screen matching applications, the color profile may be contain optical characteristics data of a "master" display.

At step 1070, the grayscale ramps for each of the RGB primaries are determined. The grayscale ramps are determined by measuring a plurality of equally spaced grayscale points for each of the RGB primaries at the LCD screen. For instance, the luminance levels for 32 equally spaced grayscale levels may be measured and used to construct a gamma curve of the LCD screen. Grayscale ramp data are then used by the host computer to determine a gamma value of the LCD display screen using well known methods and algorithms.

At step 1080, the gamma value obtained from step 1070 is then compared with a reference gamma value contained in the color profile to generate an appropriate transfer function. In the present embodiment, the transfer function may comprise a ratio of input digital value and output digital value. Further, methods and algorithms for generating the appropriate transfer, function which maps one gamma curve to another are well known in the art. Accordingly, the details of the algorithms are not described herein to avoid obscuring aspects of the present invention.

At step 1090, the transfer function obtained from step 1080 is loaded into the color LUT of the graphics controller. This transfer function accomplishes the mapping of the native transfer function of the display to the reference transfer function. In this way, the flat panel LCD screen is tweaked to arrive at the desired gamma value.

A significant advantage of the present embodiment is that, as luminance sensors are much less expensive than sophisticated tri-stimulus colorimeters, it would be economically feasible to include one luminance sensor with every flat panel LCD monitor for performing color calibration. Users of color critical applications such as pre-press soft proofing and desktop publication would also find the present invention useful as only one expensive tri-stimulus colorimeter would be necessary to color-match multiple flat panel LCD monitors.

Figure 17:
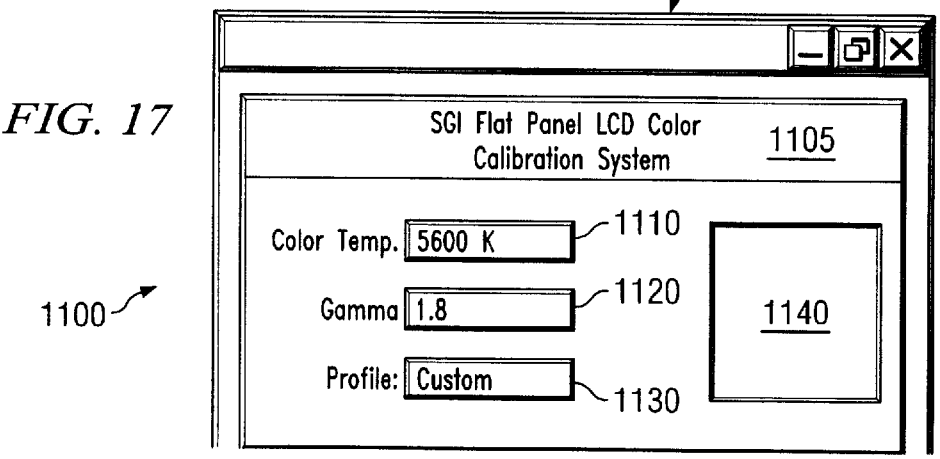
FIG. 17 illustrates an exemplary graphics user interface (GUI) of the white balance adjustment and gamma correction software in furtherance of the present invention.

FIG. 17 illustrates an exemplary graphics user interface (GUI). 1100 of the white balance adjustment and gamma correction software according to one embodiment of the present invention. GUI 1100 is configured for displaying on LCD screen 210 of flat panel LCD monitor 216. Further, as shown, the white balance adjustment and gamma correction software is configured for running under a windows-based operating system, such as Microsoft's Windows NT. Particularly, the GUI 1100 of the present invention comprises a window 1105 for displaying information.

In the particular embodiment as illustrated, GUI 1100 includes a field 1110 for displaying a currently selected color temperature, and a field 1120 for displaying a currently selected gamma value. The selected color temperature and gamma value will be used in profiling process and calibration process illustrated in FIG. 15 and 16 respectively. In addition, GUI 1100 includes a field 1130 for displaying a name of the currently selected reference profile. As shown in FIG. 17, a "custom" profile corresponding to a color temperature of 5600 K and a gamma of 1.8 is selected. It should be appreciated that fields 1110, 1120, and 1130 may also be used to allow users to select any possible color temperatures and gamma values, and any predetermined and preloaded reference profiles.

GUI 1100 further includes display window 1140 for displaying images during color calibration. As discussed above, during a color profiling or calibration process, an image or a series of images having known RGB values are displayed in display window 1140 to be measured by light sensing device 800. According to one embodiment of the present invention, the display window 1140 is aligned at a center of LCD screen 210 to facilitate measurement of optical characteristics by light sensing device 800.

A system and method for providing independent white balance adjustment and gamma correction capabilities for flat panel liquid crystal display monitors have thus been described. While the present invention has been described in particular embodiments, it should be appreciated that the present invention should not be construed as limited by such embodiments, but rather construed according to the below claims. The present invention has also been described in conjunction with a wide aspect ratio flat panel LCD monitor. However, it should be appreciated that the present invention is equally applicable to regular aspect ratio flat panel monitors running in XGA, SXGA, SVGA, UXGA, HDTV and other display modes.

What is claimed is:

1. A high-precision flat panel monitor for displaying information originated by a host computer, said precision flat panel monitor comprising:

an image data input for coupling to said host computer to receive image data;

a liquid crystal display screen for displaying a representation of said image data, said liquid crystal display screen further comprising a first white light source of a first color temperature and a second white light source of a second color temperature, wherein said first and second white light sources are positioned to illuminate said liquid crystal display screen with light having a net color temperature that is adjustable by adjusting a first luminance level of said first white light source and a second luminance level of said second white light source;

a white-balance adjustment control input for coupling to said host computer to receive a white-balance adjustment control signal, wherein said white-balance adjustment control signal further comprises a first signal for controlling said first luminance level and a second signal for controlling said second luminance level; and a controller circuit responsive to said white-balance adjustment control signal for adjusting a white-balance of said liquid crystal display screen, wherein grayscale resolution of said liquid crystal display screen is substantially unaffected by said adjusting of said white-balance of said liquid crystal display screen.

2. The high-precision flat panel monitor according to claim 1 further comprising:
  a color measurement input configured for coupling to a colorimeter to receive color measurement data associated with said liquid crystal display screen; and
  a color measurement output configured for coupling to said host computer to transmit said color measurement data of said liquid crystal display screen for color-correcting said representation of said image data.

3. The high-precision flat panel monitor according to claim 1 wherein said controller circuit comprises an inter-integrated circuit (I2C) interface for receiving said white-balance adjustment control signal from said host computer.

4. The high-precision flat panel monitor according to claim 1 wherein said image data is transmitted from said host computer to said high-precision flat panel monitor via a digital interface.

5. The high-precision flat panel monitor according to claim 4 wherein said digital interface comprises a low-voltage differential signal (LVDS) interface.

6. The high-precision flat panel monitor according to claim 2 wherein said color measurement output comprises an inter-integrated circuit interface for transmitting said color measurement data from said high-precision flat-panel monitor to said host computer.

7. The high-precision flat panel monitor according to claim 1 wherein said liquid crystal display screen comprises optical compensation films for providing increased off axis angle viewing capability in both the vertical and horizontal directions.

8. The high-precision flat panel monitor according to claim 1 wherein said liquid crystal display screen has a large viewing area and a wide aspect ratio.

9. The high-precision flat panel monitor according to claim 1 wherein said liquid crystal display screen further comprises an in-plane switching liquid crystal layer for improved viewing angle.

10. The high-precision flat panel monitor according to claim 1 wherein said liquid crystal display screen further comprises a liquid crystal layer of anti-ferroelectric material for improved viewing angle.

11. The high-precision flat panel monitor according to claim 1 wherein said liquid crystal display screen further comprises a plurality of pixels having a uniform pixel pitch of approximately 0.23 mm.

12. The high-precision flat panel monitor according to claim 1 further comprising a light pipe optically coupled to receive light from said first white light source and said second white light source, said light pipe for illuminating said liquid crystal display screen with said light from said first white light source and said second white light source.

13. The high-precision flat panel monitor according to claim 12 wherein said light pipe further comprises an extraction pattern designed to uniformly distribute light to said liquid crystal display screen.

14. A high-precision flat panel monitor comprising:
  an image data input for coupling to said host computer to receive image data;
  a liquid crystal display screen for displaying said image data, said liquid crystal display screen including:
    a first white light source of a first color temperature;
    a second white light source of a second color temperature different from said first color temperature, said first and second white light sources positioned to illuminate said liquid crystal display screen with light having a net color temperature that is dependent on an intensity of said first white light source and an intensity of said second white light source wherein said first and said second white light sources alter said net color temperature of said light, within a predetermined color temperature range, by controlling said intensity of said first white light source and said intensity of said second white light source; and
  a white-balance adjustment control input for coupling to said host computer to receive a white-balance adjustment control signal, said white-balance adjustment control signal for adjusting said intensity of said first white light source and said intensity of said second white light source to adjust said net color temperature of said liquid crystal display screen, wherein grayscale resolution of said liquid crystal display screen is substantially unaffected by adjustment of said net color temperature.

15. A system for color-correcting a high-precision flat panel monitor, said flat panel monitor having a first white light source of a first color temperature and a second white light source of a second color temperature configured for adjusting white-balance of said high-precision flat panel monitor, the system comprising:
  a digital computer for coupling to transmit image data to said high-precision flat panel monitor, said digital computer having a memory stored color look-up table (LUT) for translating an uncorrected color value to a corrected color value according to a gamma curve, said digital computer further having a white-balance adjustment control output configured for coupling to said high-precision flat panel monitor to control white-balance by varying intensity levels of said first white light source and said second white light source without substantially affecting a grayscale resolution of the monitor; and
  a calorimeter for coupling to said digital computer, said calorimeter for measuring color characteristics data of said high-precision flat panel monitor during a color calibration process and for transmitting said color characteristics data to said digital computer during said color calibration process, wherein said digital computer is for adjusting said gamma curve according to any discrepancies between said color measurement data and a predefined color profile.

16. The system as described in claim 15 wherein said predefined color profile describes color characteristics of a reference display screen such that color characteristics of said high-precision flat panel monitor substantially match color characteristics of said reference display screen.

17. The system as described in claim 15 wherein said digital computer further comprises a communication port for receiving said predefined color profile from a computer network.

18. The system as described in claim 17 wherein said predefined color profile describes color characteristics of a master flat panel monitor such that said high-precision flat panel monitor is calibrated to match said master flat panel monitor, and wherein said master flat panel monitor is remotely coupled to said digital computer via said computer network.

19. The system as described in claim 15 wherein said predefined color profile describes color characteristics of said high-precision flat panel monitor and wherein said predefined color profile is generated at a preceding calibration session.

20. The system as described in claim 15 further comprising electronic circuitry for frame-rate modulating grayscale values stored in said color LUT such that visual artifacts in said high-precision flat panel monitor are substantially reduced.

21. A computer-usable medium having computer-readable program code embodied therein for causing a computer to perform a method of color-calibrating a flat panel display, said flat panel display having a liquid crystal display screen configured to be illuminated by a first white light source with a first color temperature and a second white light source with a second color temperature, said method comprising the steps of:

displaying on said flat panel display an image having a predefined white-balance value;

determining color characteristics of said flat panel display, said color characteristics being provided by a light-sensing device coupled to said flat panel display, said color characteristics further including white-balance data and gamma values of said flat panel display;

comparing said white-balance data to a predetermined reference white-balance value; and transmitting a white-balance adjustment control signal to said flat panel display to adjust a color temperature of said flat panel display by adjusting a first intensity level of said first light source and a second intensity level of said second light source without substantially affecting a grayscale resolution of the display, wherein white-balance adjustment control signal is generated according to differences between said white-balance data and said predetermined reference white-balance value.

22. The computer-usable medium as described in claim 21 wherein said method further comprises the step of repeating said displaying determining, comparing, and transmitting steps until said white-balance data of said flat panel display approximately matches said predetermined reference white-balance value.

23. The computer-usable medium as described in claim 21 wherein said flat panel display comprises a large area wide aspect ratio liquid crystal display screen.

24. The computer-usable medium as described in claim 23 wherein said large area flat panel display is non-emissive and further comprises:

a first white light source of a first color temperature; and a second white light source of a second color temperature different from said first color temperature, said first and second white light sources positioned to illuminate said large area flat panel display with light having a net color temperature that is dependent on an intensity of said first white light source and an intensity of said second white light source wherein said first and said second white light sources alter said net color temperature of said light, within a predetermined color temperature range, wherein said intensity of said first white light source and said intensity of said second white light source are controlled by said white-balance adjustment control signal.

25. The computer-usable medium as described in claim 21 wherein said white-balance adjustment control signal and said color characteristics data are transmitted between said computer and said flat panel display via an inter-integrated circuit interface.

26. The computer-usable medium as described in claim 21 wherein said light-sensing device comprises a colorimeter.

27. The computer-usable medium as described in claim 26 wherein said calorimeter further comprises attachment means for attaching to said flat panel display without affecting color characteristics of said flat panel display.

28. The computer-usable medium as described in claim 21 wherein said method further comprises the steps of:

comparing said gamma values of said flat panel display to a predetermined reference gamma curve; and modifying a color look-up table stored in a memory unit of said computer to alter said gamma values of said flat panel display until said gamma values approximately match said predetermined reference gamma curve.

29. The computer-usable medium as described in claim 28 wherein said method further comprises the step of frame-rate modulating said gamma values such that visual artifacts are substantially reduced.

* * * * *